(12) United States Patent
Doi et al.

(10) Patent No.: US 9,027,830 B2
(45) Date of Patent: May 12, 2015

(54) CASH HANDLING SYSTEM, CASH HANDLING METHOD, MANAGEMENT UNIT AND CASH ACCOUNTING APPARATUS

(75) Inventors: Kazuhiro Doi, Himeji (JP); Minoru Higashiyama, Himeji (JP); Keiju Nakagawa, Tatsuno (JP)

(73) Assignee: Glory Ltd., Himeji-Shi, Hyogo-Ken (JP)

( * ) Notice: Subject to any disclaimer, the term of this patent is extended or adjusted under 35 U.S.C. 154(b) by 0 days.

(21) Appl. No.: 14/129,170

(22) PCT Filed: Jun. 20, 2012

(86) PCT No.: PCT/JP2012/065771
§ 371 (c)(1),
(2), (4) Date: Dec. 24, 2013

(87) PCT Pub. No.: WO2012/176814
PCT Pub. Date: Dec. 27, 2012

(65) Prior Publication Data
US 2014/0124573 A1    May 8, 2014

(30) Foreign Application Priority Data

Jun. 24, 2011  (JP) ................................. 2011-140552

(51) Int. Cl.
*G06Q 40/00*    (2012.01)
*G07D 11/00*    (2006.01)
(Continued)

(52) U.S. Cl.
CPC .............. *G06Q 40/12* (2013.12); *G07F 19/202* (2013.01); *G07F 19/203* (2013.01); *G07G 1/0018* (2013.01); *G07D 9/00* (2013.01); *G07D 11/0087* (2013.01); *G07D 11/0006* (2013.01)

(58) Field of Classification Search
CPC .............. G07D 11/00; G07D 11/0084; G07D 11/0009; G07F 19/00; G07F 17/00; G07F 7/04; G07F 17/50; G06Q 30/00; G06Q 90/00; A01K 5/02
USPC .......... 235/379, 375, 385; 705/29, 40, 43, 45; 194/206
See application file for complete search history.

(56) References Cited

U.S. PATENT DOCUMENTS 5,944,163 A    8/1999   Keith, III et al.
2005/0077347 A1   4/2005   Uematsu et al.
(Continued)

FOREIGN PATENT DOCUMENTS

| JP | 11-110612 | 4/1999 |
|----|-----------|--------|
| JP | 2006-59269 | 3/2006 |

(Continued)

OTHER PUBLICATIONS

European Search Report (Application No. 12803234.9-PCT/JP2012/065771) (6 pages—dated Dec. 3, 2015).

*Primary Examiner* — Edwyn Labaze
(74) *Attorney, Agent, or Firm* — Renner, Kenner, Greive, Bobak, Taylor & Weber

(57) ABSTRACT

There is provided a cash handling system capable of reliably storing sales proceeds and the like stored in a cash settlement apparatus into a cash accounting apparatus. A cash management system 1 includes a cash settlement apparatus 11, a cash accounting apparatus 21 and the cash transport cassette 30. The cash settlement apparatus 11 and the cash accounting apparatus 21 have reading units 157, 257, respectively, which are configured to read out cassette ID information from a memory unit 35 of the cash transport cassette 30. In addition, the cash management system 1 further includes: a management unit 26 having a depositing judgment unit 26A configured to judge whether cash in the cash settlement apparatus 11 to be received by the cash transport cassette 30 can be deposited into the cash accounting apparatus 21 or not; a guide apparatus configured to guide information from the management unit 26; and a comparison unit 27 configured to compare the cassette ID information read out by the reading unit 257 of the cash accounting apparatus 21 and the information from the management unit 26.

10 Claims, 19 Drawing Sheets

(51) Int. Cl.
  *G07F 19/00* (2006.01)
  *G07G 1/00* (2006.01)
  *G07D 9/00* (2006.01)

(56) References Cited

U.S. PATENT DOCUMENTS

2007/0112459 A1* 5/2007 Bell et al. .................. 700/221
2009/0101723 A1* 4/2009 Uehara et al. ............... 235/7 A
2009/0140039 A1* 6/2009 Force et al. .................. 235/379
2011/0198191 A1* 8/2011 Nireki ......................... 194/206
2012/0276881 A1* 11/2012 Seibert ...................... 455/414.1

FOREIGN PATENT DOCUMENTS

| JP | 2007-328698 | 12/2007 |
| JP | 4485884 | 6/2010 |
| WO | WO 2008/063911 A2 | 5/2008 |

* cited by examiner

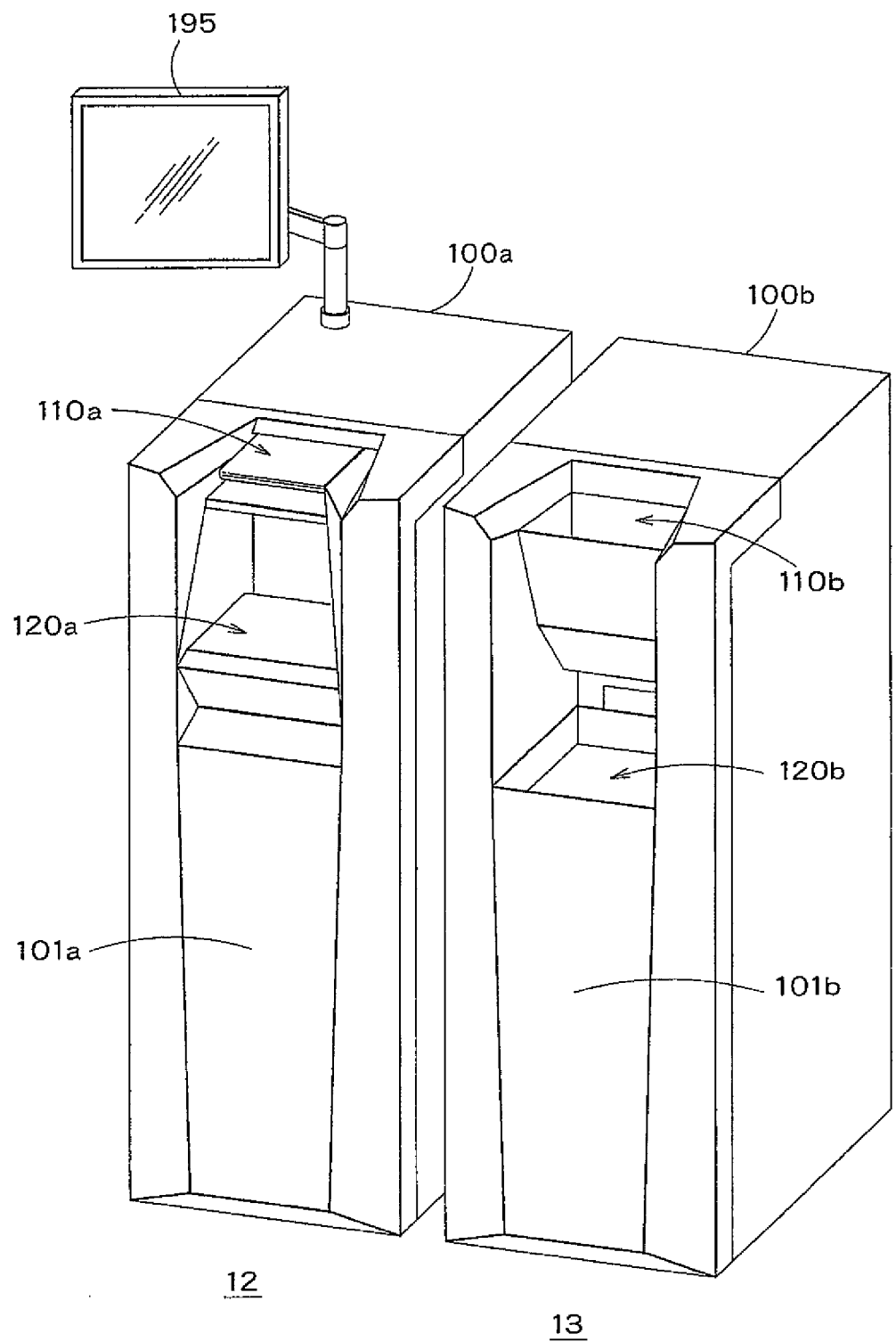
F I G. 2

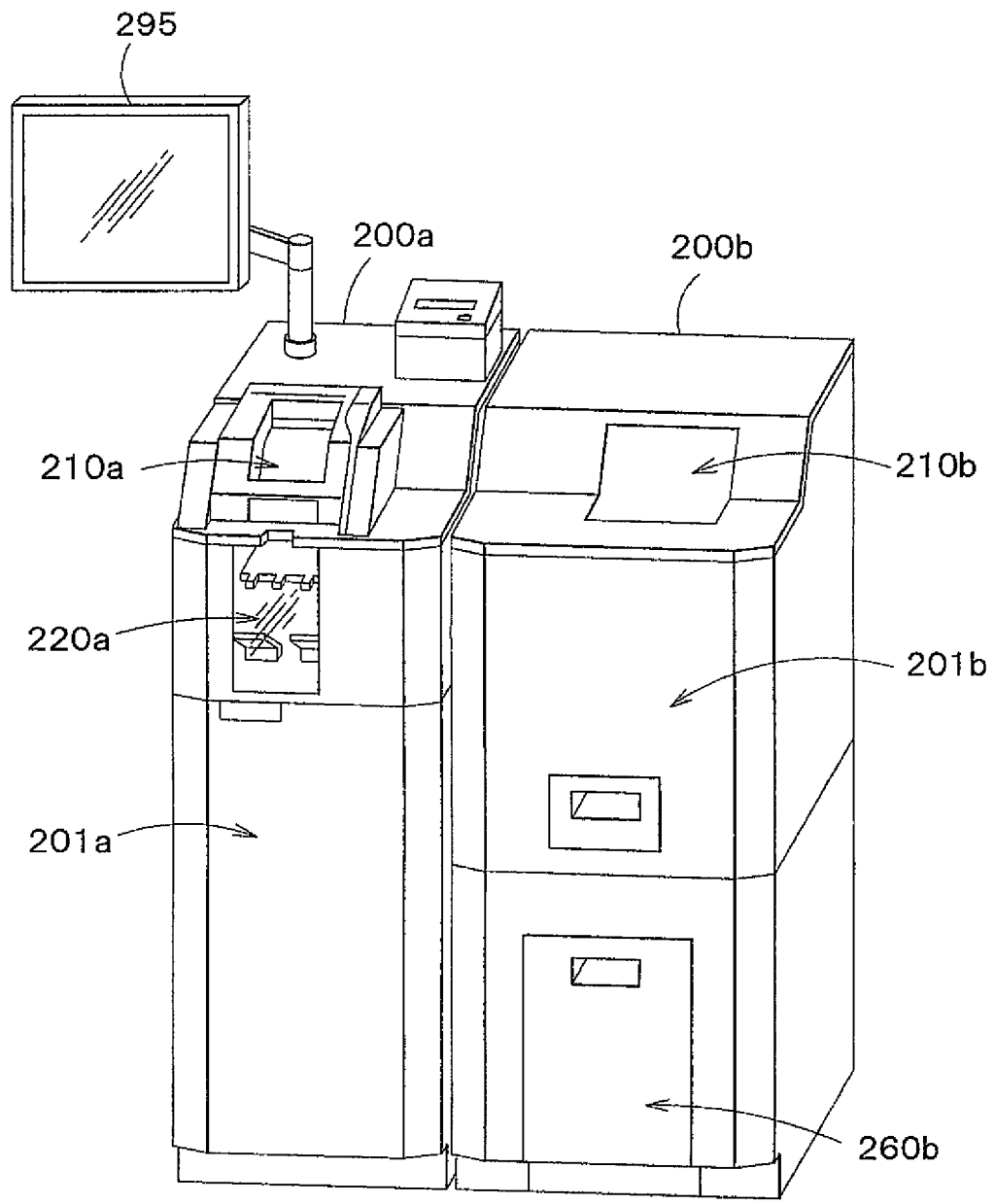
F I G. 6

| CASH SETTLEMENT APPARATUS | | CASH ACCOUNTING APPARATUS | | | |
|---|---|---|---|---|---|
| ID | COLLECTED AMOUNT | | DEPOSITING JUDGEMENT | | |
| | | | Y1 | Y2 | Y3 |
| X1 | 90 | MONEY AMOUNT UPON JUDGEMENT | 250 | 200 | 40 |
| | | JUDGEMNT RESULT | NG | OK | OK |

FIG.11

| CASH SETTLEMENT APPARATUS | | CASH ACCOUNTING APPARATUS | | | | |
|---|---|---|---|---|---|---|
| ID | COLLECTED AMOUNT | | DEPOSITING JUDGEMENT | | | SELECTION RESULT |
| | | | Y1 | Y2 | Y3 | |
| X1 | 90 | MONEY AMOUNT UPON JUDGEMENT | 250 | 200 | 40 | Y2 |
| | | JUDGEMNT RESULT | NG | OK(290) | OK(130) | |

FIG.13

| CASH SETTLEMENT APPARATUS | | CASH ACCOUNTING APPARATUS | | | | SELECTION RESULT |
|---|---|---|---|---|---|---|
| ID | COLLECTED AMOUNT | | DEPOSITING JUDGEMENT | | | |
| | | | Y1 | Y2 | Y3 | |
| X1 | 90 | MONEY AMOUNT UPON JUDGEMENT | 250 | 200 | 40 | Y2 |
| | | JUDGEMENT RESULT | NG | OK(290) | OK(130) | |
| X2 | 40 | MONEY AMOUNT UPON JUDGEMENT | 250 | 290 | 40 | Y1 |
| | | JUDGEMENT RESULT | OK(290) | NG | OK(80) | |
| X3 | 120 | MONEY AMOUNT UPON JUDGEMENT | 290 | 290 | 40 | Y3 |
| | | JUDGEMENT RESULT | NG | NG | OK(160) | |

FIG.14

| CASH SETTLEMENT APPARATUS | | | CASH ACCOUNTING APPARATUS | | | | | | |
|---|---|---|---|---|---|---|---|---|---|
| ID | COLLECTED AMOUNT | | DEPOSITING JUDGEMENT | | | DISPENSING JUDGEMENT | | | |
| | | | Y1 | Y2 | Y3 | Y1 | Y2 | Y3 | |
| | | MONEY AMOUNT UPON JUDGEMENT | 150 | 200 | 40 | 150 | 200 | 40 | |
| X1 | 90 | JUDGEMNT RESULT | OK | OK | OK | OK | OK | NG | |

FIG.16

| CASH SETTLEMENT APPARATUS | | | CASH ACCOUNTING APPARATUS | | | | | | |
|---|---|---|---|---|---|---|---|---|---|
| ID | COLLECTED AMOUNT | | DEPOSITING JUDGEMENT | | | DISPENSING JUDGEMENT | | | SELECTION RESULT |
| | | | Y1 | Y2 | Y3 | Y1 | Y2 | Y3 | |
| | | MONEY AMOUNT UPON JUDGEMENT | 150 | 200 | 40 | 150 | 200 | 40 | |
| X1 | 90 | JUDGEMENT RESULT | OK(240) | OK(290) | OK(130) | OK | OK | NG | Y2 |

FIG.18

| CASH SETTLEMENT APPARATUS | | CASH ACCOUNTING APPARATUS | | | | | | | |
|---|---|---|---|---|---|---|---|---|---|
| | | DEPOSITING JUDGEMENT | | | DEPOSITING JUDGEMENT | | | | SELECTION RESULT |
| ID | COLLECTED AMOUNT | | Y1 | Y2 | Y3 | Y1 | Y2 | Y3 | |
| X1 | 90 | MONEY AMOUNT UPON JUDGEMENT | 150 | 200 | 40 | 150 | 200 | 40 | Y2 |
| | | JUDGEMNT RESULT | OK(240) | OK(290) | OK(130) | OK | OK | NG | |
| X2 | 40 | MONEY AMOUNT UPON JUDGEMENT | 150 | 290 | 40 | 150 | 140 | 40 | Y1 |
| | | JUDGEMNT RESULT | OK(190) | NG | OK(80) | OK | — | NG | |
| X3 | 120 | MONEY AMOUNT UPON JUDGEMENT | 190 | 290 | 40 | 40 | 140 | 40 | Y3 |
| | | JUDGEMNT RESULT | NG | NG | OK(160) | — | — | OK | |

FIG.19

CASH HANDLING SYSTEM, CASH HANDLING METHOD, MANAGEMENT UNIT AND CASH ACCOUNTING APPARATUS

This application is a National Phase filing of PCT Application No. PCT/JP2012/065771 filed on Jun. 20, 2012 which claims priority from prior Japanese Patent Application No. 2011-140552 filed on Jun. 24, 2011, the entire contents of which are incorporated by reference.

TECHNICAL FIELD

The present invention relates to a cash handling system and a cash handling method. For example, the present invention relates to a cash handling system and a cash handling method capable of handling over cash and storing the cash in a settlement process in a store. In addition, the present invention relates to a management unit and a cash accounting apparatus.

BACKGROUND ART

In a checkout counter of a store, a cash settlement apparatus and a POS (Point of Sale) register have been conventionally used, in order that cash is handed over between a clerk and a customer. The cash settlement apparatus has a function for recognizing and counting cash having been put thereinto to calculate a sum thereof, a function for storing the cash, and a function for dispensing the cash stored therein as change.

On the other hand, in a back office of a store, a cash accounting apparatus is used for loading a cash settlement apparatus installed in the store with cash such as a change fund and the like, or for collecting sales proceeds and the like from the cash settlement apparatus. The cash accounting apparatus has a function for storing cash having been collected from the cash settlement apparatus, and a function for dispensing cash to be loaded into the cash settlement apparatus.

In general, it is necessary for a clerk to store sales proceeds and the like, which are stored in the cash settlement apparatus in the checkout counter, into the cash accounting apparatus in the back office. However, there is an upper limit in an amount of cash stored in the cash accounting apparatus. Thus, even when the sales proceeds are transported from the cash settlement apparatus to the cash accounting apparatus, there is a possibility that the cash cannot be deposited into the cash accounting apparatus.

In order to solve this problem, Patent Documents 1 and 2 respectively propose a deposit system including a query unit capable of inquiring a deposit capable/incapable condition of a cash accounting apparatus, and of displaying a query result. Thus, it is possible to avoid a condition in which a transported cash cannot be deposited into a cash accounting apparatus.
Patent Document 1: JP4485884B
Patent Document 2: JP2006-59269A

SUMMARY OF THE INVENTION

Transport of cash from a cash settlement apparatus to a cash accounting apparatus is generally performed by a clerk who transports a cash transport cassette storing the cash. In this case, while the clerk transports the cash from the cash settlement apparatus to the cash accounting apparatus, an accidental event may occur. For example, for some reason or other during transport, it can be considered that the clerk mistakes a certain cash transport cassette storing cash of such an amount that was judged to be depositable in a query by the query unit, for another cash transport cassette. In this case, there is a possibility that the cash from the other cash transport cassette, which is different from the certain cash transport cassette, is deposited into the cash accounting apparatus, so that the intended transported cash cannot be deposited into the cash accounting apparatus.

The object of the present invention is to provide a cash handling system, a cash handling method, a management unit and a cash accounting apparatus capable of efficiently solving the problem.

A cash handling system according to the present invention is a cash handling system including: a cash settlement apparatus configured to perform a settlement process with respect to a customer, by depositing and dispensing cash; a cash accounting apparatus configured to dispense cash to be loaded into the cash settlement apparatus, and configured to deposit cash having been collected from the cash settlement apparatus; and a cash transport cassette attachable to and detachable from the cash settlement apparatus and the cash accounting apparatus, the cash transport cassette configured to receive cash from the cash settlement apparatus to transfer the cash to the cash accounting apparatus; wherein: the cash transport cassette includes a memory unit configured to store at least cassette ID information for specifying the cash transport cassette; each of the cash settlement apparatus and the cash accounting apparatus has a reading unit configured to read out the cassette ID information from the memory unit of the cash transport cassette; there are further provided a management unit and a comparison unit; the management unit is communicably connected to the cash settlement apparatus and the cash accounting apparatus, the management unit includes a depositing judgment unit configured to, when the cash transport cassette is attached to the cash settlement apparatus, judge whether cash in the cash settlement apparatus to be received by the cash transport cassette is depositable into the cash accounting apparatus or not, and the management unit is configured to transmit to the comparison unit the cassette ID information of the cash transport cassette that receives the cash from the cash settlement apparatus, the cash having been judged by the depositing judgment unit to be depositable into the cash accounting apparatus; and the comparison unit is configured to, when the cash transport cassette is attached to the cash accounting apparatus, compare the cassette ID information having been read out by the reading unit of the cash accounting apparatus and the cassette ID information having been transmitted from the management unit.

In the cash handling system according to the present invention, a plurality of the cash accounting apparatuses may be provided. In this case, the depositing judgment unit of the management unit may be configured to, when the cash transport cassette is attached to the cash settlement apparatus, judge whether the cash in the cash settlement apparatus to be received by the cash transport cassette is depositable into each of the cash accounting apparatuses or not; the management unit may further include a selection unit configured to, when the cash transport cassette is attached to the cash settlement apparatus, select one of the cash accounting apparatuses based on information from the depositing judgment unit, the cash in the cash settlement apparatus received by the cash transport cassette being to be deposited into the selected cash accounting apparatus; and the comparison unit may be configured to, when the cash transport cassette is attached to any one of the plurality of cash accounting apparatuses, compare the cassette ID information having been read out by the reading unit of the cash accounting apparatus and information from the selection unit of the management unit.

In the cash settlement apparatus of the cash handling system according to the present invention, a preset loading amount that is an amount of cash to be loaded into the cash settlement apparatus may be set. In this case, the cash transport cassette may be configured to receive the cash in the cash settlement apparatus such that cash of the preset loading amount remains in the cash settlement apparatus, and may be configured to transfer the received cash to the cash accounting apparatus.

In the cash handling system according to the present invention, the cash transport cassette may also be configured to receive cash from the cash accounting apparatus and to transfer the cash to the cash settlement apparatus. In this case, in the cash settlement apparatus, a preset loading amount that is an amount of cash to be loaded into the cash settlement apparatus may be set; and the management unit may further include a dispensing judgment unit configured to, when the cash transport cassette is attached to the cash settlement apparatus, judge whether cash of an amount satisfying the preset loading amount of the cash settlement apparatus may be dispensed from the cash accounting apparatus or not.

In the cash handling system according to the present invention, a plurality of the cash accounting apparatuses may be provided. In this case, the depositing judgment unit of the management unit may be configured to, when the cash transport cassette is attached to the cash settlement apparatus, judge whether the cash in the cash settlement apparatus to be received by the cash transport cassette is depositable into each of the cash accounting apparatuses or not; the dispensing judgment unit of the management unit may be configured to, when the cash transport cassette is attached to the cash settlement apparatus, judge whether cash of an amount satisfying the preset loading amount of the cash settlement apparatus may be dispensed from each of the cash accounting apparatuses or not; the management unit may further include a selection unit configured to, when the cash transport cassette is attached to the cash settlement apparatus, select one of the cash accounting apparatuses based on information from the depositing judgment unit and the dispensing judgment unit, the cash in the cash settlement apparatus received by the cash transport cassette being to be deposited into the selected cash accounting apparatus; and the comparison unit may be configured to, when the cash transport cassette is attached to any one of the plurality of cash accounting apparatuses, compare the cassette ID information having been read out by the reading unit of the cash accounting apparatus and information from the selection unit of the management unit.

A cash handling method according to the present invention is a cash handling method including: attaching a cash transport cassette to a cash settlement apparatus; reading out, by the cash settlement apparatus, cassette ID information of the cash transport cassette attached to the cash settlement apparatus, and transmitting to a management unit the cassette ID information and information related to cash in the cash settlement apparatus to be received by the cash transport cassette; judging, by the management unit, when the cash transport cassette is attached to the cash settlement apparatus, whether the cash in the cash settlement apparatus to be received by the cash transport cassette is depositable into a cash accounting apparatus or not; transmitting, by the management unit, to a comparison unit, the cassette ID information of the cash transport cassette that receives the cash from the cash settlement apparatus, the cash having been judged to be depositable into the cash accounting apparatus; receiving, by the cash transport cassette, the cash in the cash settlement apparatus; detaching the cash transport cassette from the cash settlement apparatus and thereafter attaching the cash transport cassette to the cash accounting apparatus; reading out, by the cash accounting apparatus, the cassette ID information of the cash transport cassette attached to the cash accounting apparatus, and transmitting the cassette ID information to the comparison unit; and comparing, by the comparison unit, when the cash transport cassette is attached to the cash accounting apparatus, the cassette ID information having been read out by the cash accounting apparatus and the cassette ID information having been transmitted from the management unit.

A management unit according to the present invention is a management unit used in a cash handling system including: a cash settlement apparatus configured to perform a settlement process with respect to a customer, by depositing and dispensing cash; a cash accounting apparatus configured to dispense cash to be loaded into the cash settlement apparatus, and configured to deposit cash having been collected from the cash settlement apparatus; a cash transport cassette attachable to and detachable from the cash settlement apparatus and the cash accounting apparatus, the cash transport cassette configured to receive cash from the cash settlement apparatus to transfer the cash to the cash accounting apparatus; the management unit; and a comparison unit; wherein: the cash transport cassette includes a memory unit configured to store at least cassette ID information for specifying the cash transport cassette; each of the cash settlement apparatus and the cash accounting apparatus has a reading unit configured to read out the cassette ID information from the memory unit of the cash transport cassette; the management unit is communicably connected to the cash settlement apparatus and the cash accounting apparatus, the management unit includes a depositing judgment unit configured to, when the cash transport cassette is attached to the cash settlement apparatus, judge whether cash in the cash settlement apparatus to be received by the cash transport cassette is depositable into the cash accounting apparatus or not, and the management unit is configured to transmit to the comparison unit the cassette ID information of the cash transport cassette that receives the cash from the cash settlement apparatus, the cash having been judged by the depositing judgment unit to be depositable into the cash accounting apparatus; and the comparison unit of the cash handling system is configured to, when the cash transport cassette is attached to the cash accounting apparatus, compare the cassette ID information having been read out by the reading unit of the cash accounting apparatus and the cassette ID information having been transmitted from the management unit.

A cash accounting apparatus according to the present invention is a cash accounting apparatus to which a cash transport cassette storing cash is attachable, wherein: the cash transport cassette includes a memory unit configured to store at least cassette ID information for specifying the cash transport cassette; information related to whether the cash stored in the cash transport cassette is depositable into the cash accounting apparatus or not, or information related to whether the cash stored in the cash transport cassette is to be deposited into the cash accounting apparatus or not, is generated in advance in relation to the cassette ID information; and the cash accounting apparatus includes: a reading unit configured to read out the cassette ID information from the memory unit of the cash transport cassette; and a comparison unit configured to, when the cash transport cassette is attached to the cash accounting apparatus, compare the cassette ID information having been read out by the reading unit and the cassette ID information in relation to the information generated in advance.

According to the present invention, sales proceeds and so on stored in the cash transport cassette can be reliably stored into the cash accounting apparatus.

BRIEF DESCRIPTION OF THE DRAWINGS

FIG. 2 is a outline view showing an example of each cash settlement apparatus 11.

FIG. 6 is an outline view showing an example of a cash accounting apparatus 21.

FIG. 11 is a view showing a judgment result by a management unit in the first operational embodiment.

FIG. 13 is a view showing a judgment result and a selection result by the management unit in the second operational embodiment.

FIG. 14 is a view showing a judgment result and a selection result by the management unit in a third operational embodiment.

FIG. 16 is a view showing a judgment result by the management unit in the fourth operational embodiment.

FIG. 18 is a view showing a judgment result and a selection result by the management unit in the fifth operational embodiment.

FIG. 19 is a view showing a judgment result and a selection result by the management unit in a sixth operational embodiment.

DETAILED DESCRIPTION OF THE INVENTION

A first embodiment according to the present invention will be described herebelow with reference to the drawings. This embodiment does not limit the present invention.

Figure 1:
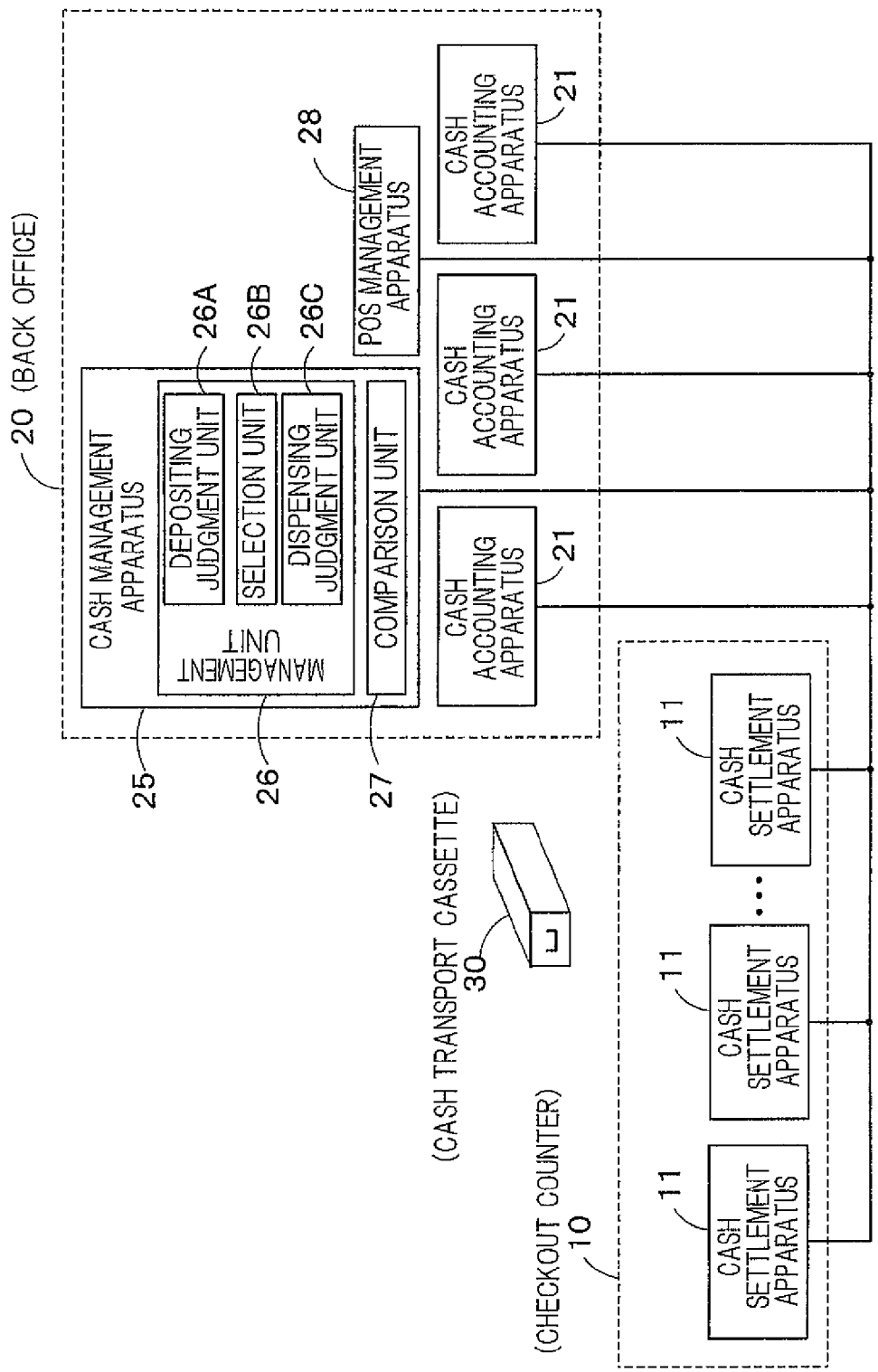
FIG. 1 is a block diagram showing a structural example of a cash management system 1 in an embodiment according to the present invention.

FIG. 1 is a block diagram showing a structural example of a cash management system 1 in a first embodiment according to the present invention. The cash management system 1 is a system configured to handle and manage cash received by a clerk from a customer and cash to be paid by the clerk to the customer.

The cash management system 1 is installed in a checkout area in a store. The cash management system 1 is composed of a checkout counter 10 configured to deposit and dispense cash handed over between a clerk and a customer, a back office 20 configured to manage cash in the checkout counter 10 and commercial products, and a cash transport cassette 30 configured to transport cash between the checkout counter 10 and the back office 20.

The checkout counter 10 is provided with one or more cash settlement apparatuses 11 configured to perform a settlement process with respect to a customer, by depositing and dispensing cash. For example, the thirty cash settlement apparatuses 11 in total are provided. Each cash settlement apparatus 11 is operated by a clerk or a customer himself/herself so as to be used in a settlement process between the clerk and the customer. For example, the cash settlement apparatus 11 deposits payment paid by a customer, and dispenses change to be paid to the customer.

The cash settlement apparatus 11 is communicably connected to a POS register operated by a clerk or a self-checkout register operated by a customer, for example. The cash settlement apparatus 11 may be integrally formed with the POS register or the self-checkout register.

The back office 20 is provided with one or more cash accounting apparatuses 21, a cash management apparatus 25 and a POS management apparatus 28. For example, the three cash accounting apparatuses 21 in total are provided. Each cash accounting apparatus 21 is communicably connected to the cash settlement apparatuses 11, and is configured to dispense a change fund to be loaded into the cash settlement apparatuses 11, and configured to deposit sales proceeds having been collected from the cash settlement apparatuses 11. The cash management apparatus 25 is communicably connected to the cash settlement apparatuses 11 and the cash accounting apparatus 21 through a LAN (Local Area Network) or the like. The cash management apparatus 25 is configured to manage cash stored in the cash settlement apparatuses 11 and the cash accounting apparatus 21. For example, the cash management apparatus 25 is configured to manage cash having been settled in the respective cash settlement apparatuses 11, and cash having been transferred between each cash settlement apparatus 11 and the cash accounting apparatus 21. In addition, the cash management apparatus 25 may monitor whether the cash transport cassette 30 is attached or not to the cash settlement apparatus 11 or the cash accounting apparatus 21. The POS management apparatus 28 is configured to manage a flow of commercial products. Since the flow of commercial products is not directly related to the present invention, detailed description of the POS management apparatus 28 is omitted.

As shown in FIG. 1, the cash management apparatus 25 includes a management unit 26 and a comparison unit 27. As described below, in a collecting operation in which sales proceeds of the cash settlement apparatus 11 are transported by a clerk to the cash accounting apparatus 21, the management unit 26 is configured to, when the cash transport cassette 30 is attached to the cash settlement apparatus 11, perform judgment or selection regarding to a proper transport destination. The comparison unit 27 is configured to, when the cash transport cassette 30 is attached to the cash accounting apparatus 21, compare cassette ID information read out by a below-described reading unit 257 of the cash accounting apparatus 21 and information from the management unit 26. In the cash management apparatus 25, as long as the comparison unit 27 can read out information stored in the management unit, the management unit 26 and the comparison unit 27 may be either physically integrated with each other or physically separated from each other. As an example in which the management unit 26 and the comparison unit 27 are physically integrated with each other, there is a case in which both functions of the management unit 26 and the comparison unit 27 are realized by a software in one IC. In this case, the management unit 26 and the comparison unit 27 cannot be differentiated from each other as hardwares, but can be differentiated from each other as modules of softwares.

As shown in FIG. 1, the management unit 26 includes a depositing judgment unit 26A, a selection unit 26B and dispensing judgment unit 26C. Operations of these constituent elements will be described hereafter.

The cash transport cassette 30 is configured to be attachable to and detachable from the cash settlement apparatus 11 and the cash accounting apparatus 21. When the cash transport cassette 30 is attached to the cash settlement apparatus 11 or the cash accounting apparatus 21, the cash transport cassette 30 can transfer cash between the cash transport cassette 30 and the cash settlement apparatus 11, or transfer cash between the cash transport cassette 30 and the cash accounting apparatus 21. On the other hand, when the cash transport cassette 30 is detached from the cash settlement apparatus 11 and the cash accounting apparatus 21, the cash transport cassette 30 is configured to store cash therein such that the cash cannot be taken out therefrom. A clerk uses the cash transport cassette 30 to transport cash between the cash settlement apparatus 11 and the cash accounting apparatus 21. For example, when a change fund is loaded or when sales proceeds are collected, a clerk uses the cash transport cassette 30 to transport cash between the cash settlement apparatus 11 and the cash accounting apparatus 21. Since the clerk cannot touch the cash in the cash transport cassette 30 during the cash transportation, the cash can be safely transported in terms of security.

The cash transport cassette 30 may be configured to transport any one of a banknote and a coin, or may be configured to transport both a banknote and a coin. The cash transport cassette 30 for banknote may be a stacking-type cassette in which banknotes are stacked on one another, or may be a tape reeling-type cassette in which banknotes, which are sandwiched one by one between a pair of elongate tapes, are reeled up together with the tapes. The cash transport cassette 30 for coin may be a cassette configured to store coin in a denomination mixed state.

(Structure of Cash Settlement Apparatus 11)

Each of the cash settlement apparatuses 11 includes a coin settlement apparatus 13 configured to perform a settlement process by depositing and dispensing a coin, and a banknote settlement apparatus 12 configured to perform a settlement process by depositing and dispensing a banknote.

Figure 3:
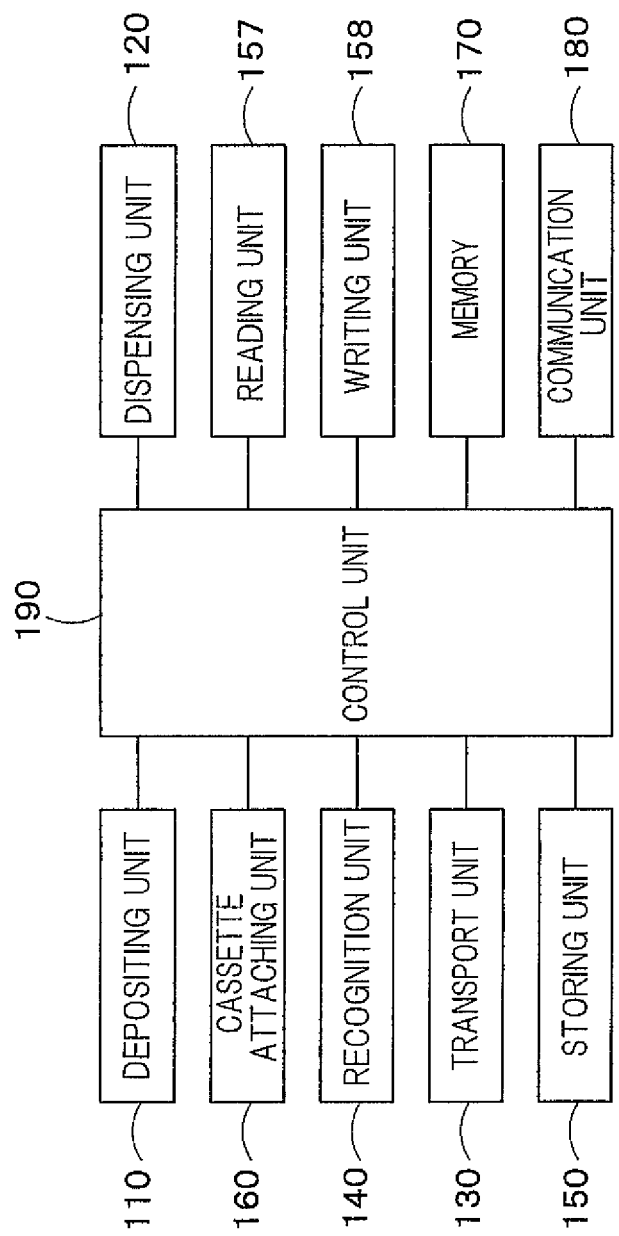
FIG. 3 is a block diagram showing a structural example of the cash settlement apparatus 11.

Herebelow, in order to differentiate constituent elements of the banknote settlement apparatus 12 and constituent elements of the coin settlement apparatus 13 from each other, a character "a" is added to a reference number of a constituent element of the banknote settlement apparatus 12, and a character "b" is added to a reference number of a constituent element of the coin settlement apparatus 13. Since the objects (a coin and a banknote) to be handled by the coin settlement apparatus 13 and the banknote settlement apparatus 12 differ from each other, the coin settlement apparatus 13 and the banknote settlement apparatus 12 differ from each other in concrete structures thereof, but the basic block structure shown in FIG. 3 is common thereto. However, a display apparatus 195 is disposed on any one of the banknote settlement apparatus 12 and the coin settlement apparatus 13, and is used in common.

FIG. 2 is a view showing an appearance of an example of each cash settlement apparatus 11. The cash settlement apparatus 11 includes the banknote settlement apparatus 12 and the coin settlement apparatus 13. The banknote settlement apparatus 12 has a housing 100a, a depositing unit 110a and a dispensing unit 120a. The display apparatus 195 is provided on the banknote settlement apparatus 12. The depositing unit 110a is provided for putting a banknote(s) having been received by a customer thereinto. The dispensing unit 120a is provided for dispensing a change banknote(s). When a front cover 101a of the housing 100a is opened, there is a cassette attaching unit (see 160a of FIG. 4) to which the cash transport cassette 30 is attached.

The coin settlement apparatus 13 has a housing 100b, a depositing unit 110b and a dispensing unit 120b. The depositing unit 110b is provided for putting a coin(s) having been received by a customer thereinto. The dispensing unit 120b is provided for dispensing a change coin(s). When a front cover 101b of the housing 100b is opened, there is a cassette attaching unit (see 160b in FIG. 5) to which the cash transport cassette 30 is attached.

FIG. 3 is a block diagram showing a structural example of the cash settlement apparatus 11. In addition to the depositing unit 110 and the dispensing unit 120, the cash settlement apparatus 11 further includes a transport unit 130, a recognition unit 140, a storing unit 150, a reading unit 157, a writing unit 158, a cassette attaching unit 160, a memory 170, a communication unit 180 and a control unit 190.

The transport unit 130 is configured to transport cash having been put into the depositing unit 110 to the storing unit 150, or configured to transport cash to be dispensed from the dispensing unit 120, from the storing unit 150. In addition, the transport unit 130 is configured to transport cash in the cash transport cassette 30, which is attached to the cassette attaching unit 160, to the storing unit 150, in order that the cash is loaded into the storing unit 150, or configured to transport cash stored in the storing unit 150 to the cash transport cassette 30, in order that the cash is collected from the storing unit 150.

The recognition unit 140 is configured to detect a denomination, an authenticity, a fitness, a version, an amount and so on of cash being transported by the transport unit 130. For example, the recognition unit 140 has a sensor such as an image sensor or a magnetic sensor.

The storing unit 150 is configured to store, by denomination, cash having been recognized by the recognition unit 140. When the storing unit 150 is configured to store banknotes, the storing unit 150 may be stacking-type storing units in which banknotes are stacked on one another by denomination, or may be a plurality of tape reeling-type storing units in which banknotes, which are sandwiched by denomination between a pair of elongate tapes, are reeled up together with the tapes.

The cassette attaching unit 160 is configured such that the cash transport cassette 30 can be attached thereto and detached therefrom. The cassette attaching unit 160 is configured to deposit cash from the cash transport cassette 30 or configured to dispense cash to the cash transport cassette 30.

The reading unit 157 is configured to read out information stored in a below-stated memory unit 35 disposed on the cash transport cassette 30. The writing unit 158 is configured to write information to the memory unit 35 disposed on the cash transport cassette 30.

The memory 170 includes various programs for controlling the cash settlement apparatus 11, a ROM (Read Only Memory) or a HDD (Hard Disk Drive) storing data, and a RAM (Random Access Memory) serving as a program loading area or a working area when a program is executed, and so on. The memory 170 also stores information (a denomination, an amount and so on) of cash stored in the storing unit 150 and the cash transport cassette 30. Further, the memory 170 may store, by denomination, an amount of cash having been recognized by the recognition unit 140.

The communication unit 180 is communicably connected to other apparatuses (the cash accounting apparatus 21, the cash management apparatus 25, the POS management apparatus 28) constituting the cash handling system 1.

The control unit 190 is a processing unit configured to execute a program in the memory 170 to control the cash settlement apparatus 11 as a whole.

Figure 4:
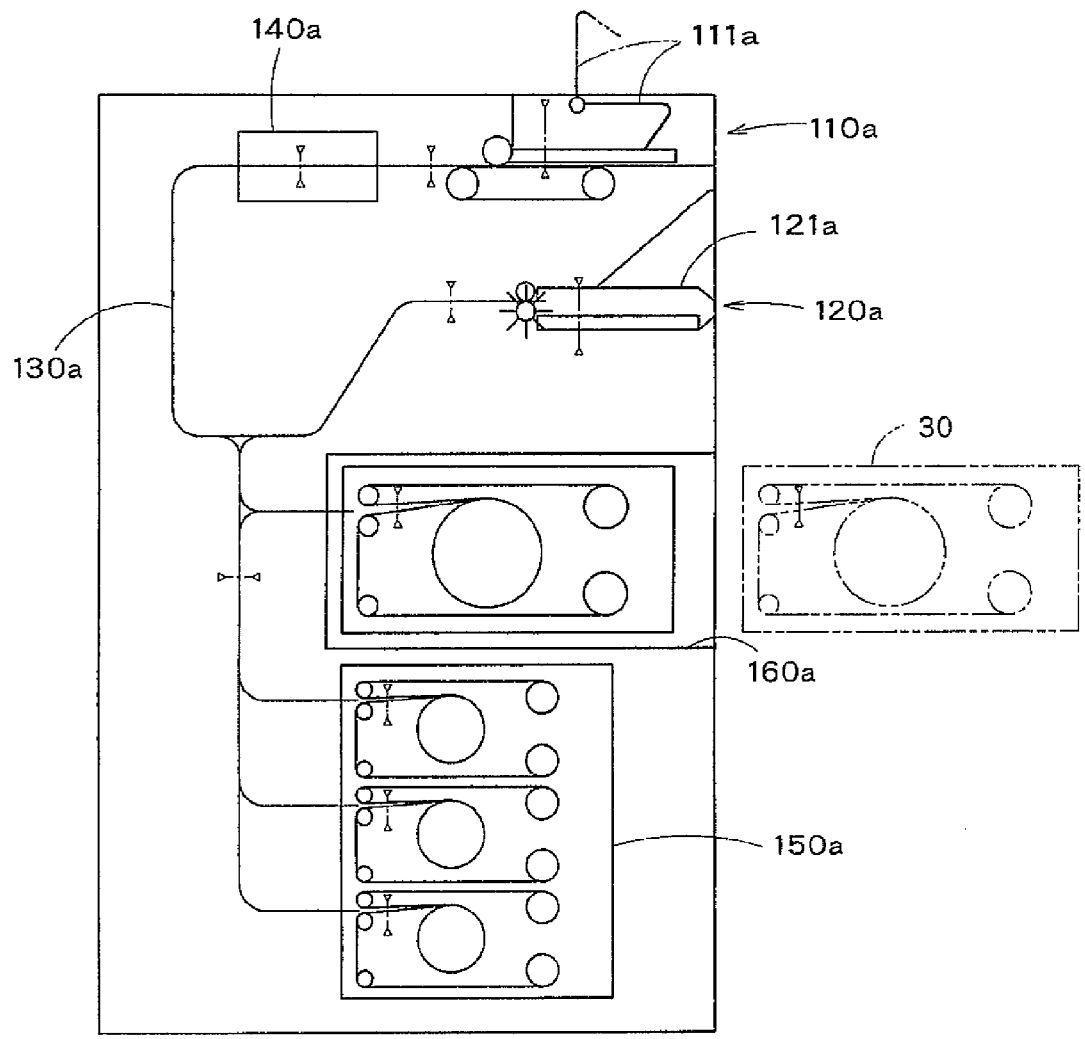
FIG. 4 is a sectional view showing an example of an inside structure of a banknote settlement apparatus 12 of the cash settlement apparatus 11.

FIG. 4 is a sectional view showing an example of an inside structure of the banknote settlement apparatus 12 of the cash settlement apparatus 11. The banknote settlement apparatus 12 includes a depositing-unit cover 111a. When a banknote(s) is deposited, a clerk opens the depositing-unit cover 111a and puts a banknote(s) into the depositing unit 110a. The depositing unit 110a is configured to feed the banknotes having been put thereinto, one by one, to the transport unit 130a. The transport unit 130a is configured to cause the fed banknotes to pass through the recognition unit 140a, and then configured to transport the banknotes to the storing unit 150a, the cash transport cassette 30 or the dispensing unit 120a. The recognition unit 140a is configured to recognize a denomination, an authenticity, a fitness, a version, an amount and so on of each of the banknotes being transported. The transport unit 130a is configured to store banknotes by denomination into the storing unit 150a, based on the recognition result by the recognition unit 140a.

When the storing unit 150a is full and so on, the transport unit 130a may transport a banknote to the cash transport cassette 30 according to need. In addition, when a banknote could not be recognized by the recognition unit 140a or when a banknote was recognized as a counterfeit note, the transport unit 130a is configured to transport the banknote to the dispensing unit 120a.

On the other hand, in order to dispense a banknote(s), the storing unit 150a is configured to feed banknotes, one by one, to the transport unit 130a. The transport unit 130a transports the fed banknotes to the dispensing unit 120a. The banknote settlement apparatus 12 is provided with a dispensing-unit shutter 121a. When a banknote is dispensed, the banknote settlement apparatus 12 opens the dispensing-unit shutter 121a and dispenses a banknote.

In this manner, the banknote settlement apparatus 12 can store a banknote having been put into the depositing unit 110a, into the storing unit 150a, and can reversely dispense a banknote having been stored into the storing unit 150a to the dispensing unit 120a. That is to say, the banknote settlement apparatus 12 is configured to reuse a banknote having been deposited thereinto, as a banknote to be dispensed.

When the cash transport cassette 30 is attached to the cassette attaching unit 160a, the banknote settlement apparatus 12 can load a banknote from the cash transport cassette 30 to the storing unit 150, or can collect a banknote from the storing unit 150a to the cash transport cassette 30. When a banknote(s) is loaded, the cash transport cassette 30 feeds banknotes, one by one, to the transport unit 130a. The transport unit 130a loads fed banknotes to the storing unit 150a. When a banknote(s) is collected, the storing unit 150a feeds banknotes, one by one, to the transport unit 130a. The transport unit 130a collects the fed banknotes to the cash transport cassette 30.

In this manner, the banknote settlement apparatus 12 is configured to load and collect a banknote(s) with the use of the cash transport cassette 30.

The display apparatus 195 is communicably connected to the management unit 26 of the cash management apparatus 25. The display apparatus 195 is configured to function as a guide apparatus for displaying information from the management unit 26. The display apparatus 195 may be a liquid crystal display, for example.

Figures 5A, 5B:
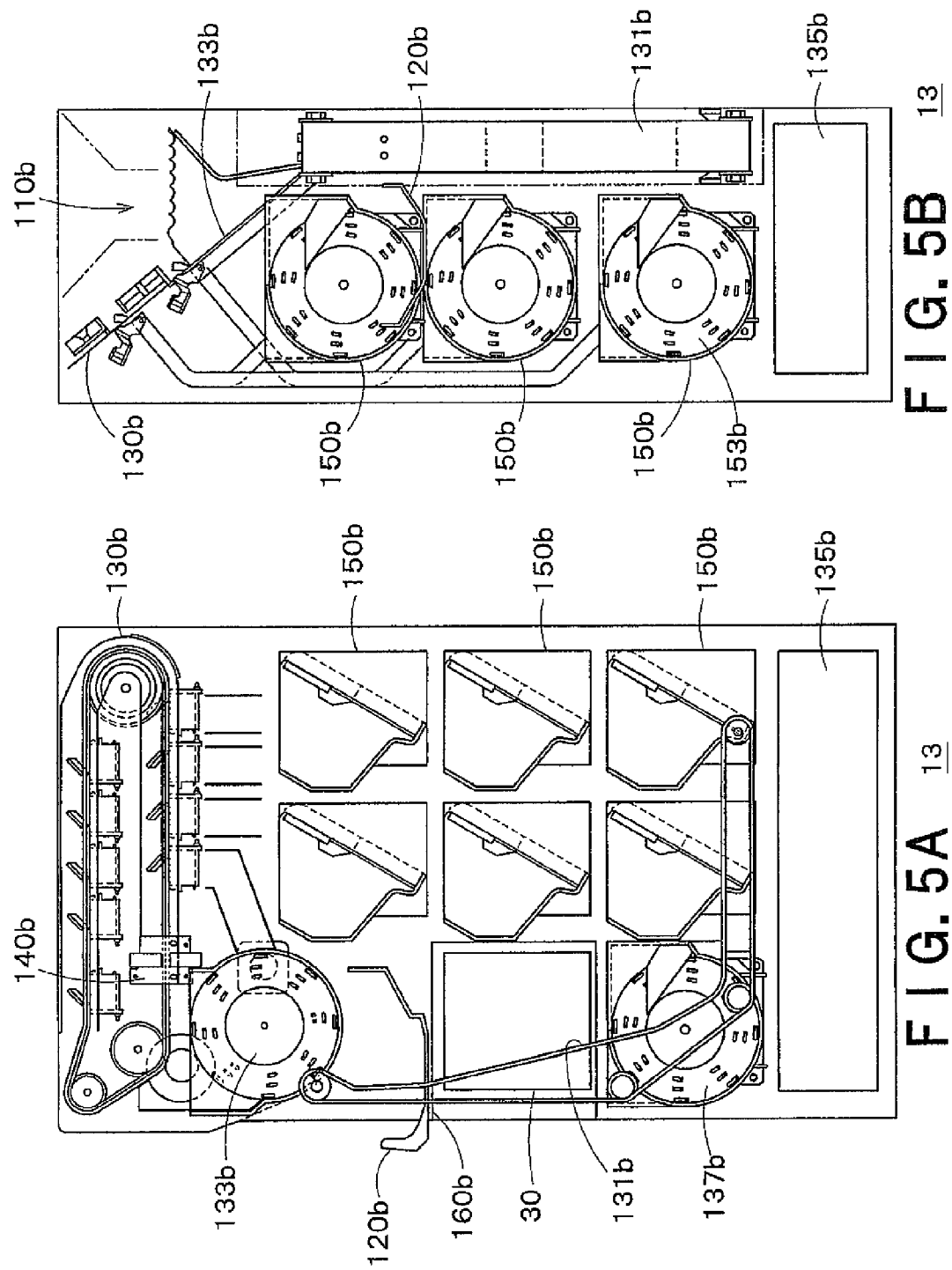
FIG. 5 is a sectional view showing an inside structure of a coin settlement apparatus 13 of the cash settlement apparatus 11.

FIGS. 5A and 5B are sectional views showing an example of an inside structure of the coin settlement apparatus 13 of the cash settlement apparatus 11. FIG. 5A is the sectional view of the coin settlement apparatus 13 when viewed from a lateral side, and FIG. 5B is the sectional view of the coin settlement apparatus when viewed from a front side. In FIG. 5B, illustration of the cash transport cassette 30 and the feeding unit 137b is omitted, but the storing units 150b are illustrated.

As shown in FIG. 5B, the coin settlement apparatus 13 includes the depositing unit 110b. When a coin(s) is deposited, a clerk puts a coin(s) into the depositing unit 110b. At this time, a plurality of coins may be put thereinto in a denomination mixed state. A centrifugal disk-type feeding unit 133b is configured to feed, one by one, coins having been put into the depositing unit 110b, to the transport unit 130b. The transport unit 130b is configured to cause the fed coins to pass through the recognition unit 140b, and then configured to transport the coins to the storing unit 150b, the cash transport cassette 30 or the dispensing unit 120b. The recognition unit 140b is configured to recognize a denomination, an authenticity, a fitness, a version, an amount and so on of each of the coins being transported. The transport unit 130b is configured to sort the coins by denomination based on the recognition result by the recognition unit 140b, and configured to store a coin into the storing unit 150b of a corresponding denomination.

When the storing unit 150b is full and so on, the transport unit 130b may transport a coin to the cash transport cassette 30 or the collection box 135b according to need. When a coin was recognized as a reject coin by the recognition unit 140b, the transport unit 130b is configured to dispense the reject coin to the dispensing unit 120b.

On the other hand, in order to dispense a coin(s), the storing unit 150b is configured to feed coins, one by one, to the transport unit 131b. The plurality of storing units 150b is configured to store money by denomination. Each of the storing units 150b has a centrifugal disk-type feeding unit 153b. The feeding unit 153b is configured to feed coins, one by one, to the transport unit 130b. The transport unit 130b is configured to transport the fed coins to the dispensing unit 120b. Thus, the coin settlement apparatus 13 dispenses the coins to the dispensing unit 120b.

In this manner, the coin settlement apparatus 13 can store a coin having been put into the depositing unit 110b, into the storing unit 150b, and can reversely dispense a coin having been stored into the storing unit 150b to the dispensing unit 120b. That is to say, the coin settlement apparatus 13 is configured to reuse a coin having been deposited thereinto, as a coin to be dispensed.

When the cash transport cassette 30 is attached to the cassette attaching unit 160b, the coin settlement apparatus 13 can load a coin from the cash transport cassette 30 to the storing unit 150b, or collect a coin from the storing unit 150b to the cash transport cassette 30. When a coin(s) is loaded, the cash transport cassette 30 dispenses a coin(s) to the feeding unit 137b shown in FIG. 5A. At this time, the cash transport cassette 30 may dispense the coins in a denomination mixed state to the feeding unit 137b. The feeding unit 137b feeds the coins to the transport unit 131b. The transport unit 131b transports the fed coins to the feeding unit 133b, and the feeding unit 133b feeds the coins, one by one, to the transport unit 130b. The transport unit 130b is configured to cause the fed coins to pass through the recognition unit 140b, and then configured to transport the coins to the storing unit 150b or the dispensing unit 120b. The recognition unit 140b is configured to recognize a denomination of each of the coins being transported. The transport unit 130b is configured to store the coins by denomination to the storing units 150b, based on the recognition result by the recognition unit 140b.

When a coin(s) is collected, the coin settlement apparatus 13 is configured to feed coins, one by one, from the storing unit 150b to the transport unit 131b. The transport unit 131b is configured to collect the fed coins to the cash transport cassette 30.

In this manner, the coin settlement apparatus 13 is configured to load and collect a coin(s) with the use of the cash transport cassette 30.

(Structure of Cash Accounting Apparatus 21)

The cash accounting apparatus 21 includes a coin accounting apparatus 23 and a banknote accounting apparatus 22. The coin accounting apparatus 23 is configured to dispense a coin to be loaded into the coin settlement apparatus 13, and configured to deposit a coin having been collected from the coin settlement apparatus 13. The banknote accounting apparatus 22 is configured to dispense a banknote to be loaded into the banknote settlement apparatus 12, and configured to deposit a banknote having been collected from the banknote settlement apparatus 12.

Figure 7:
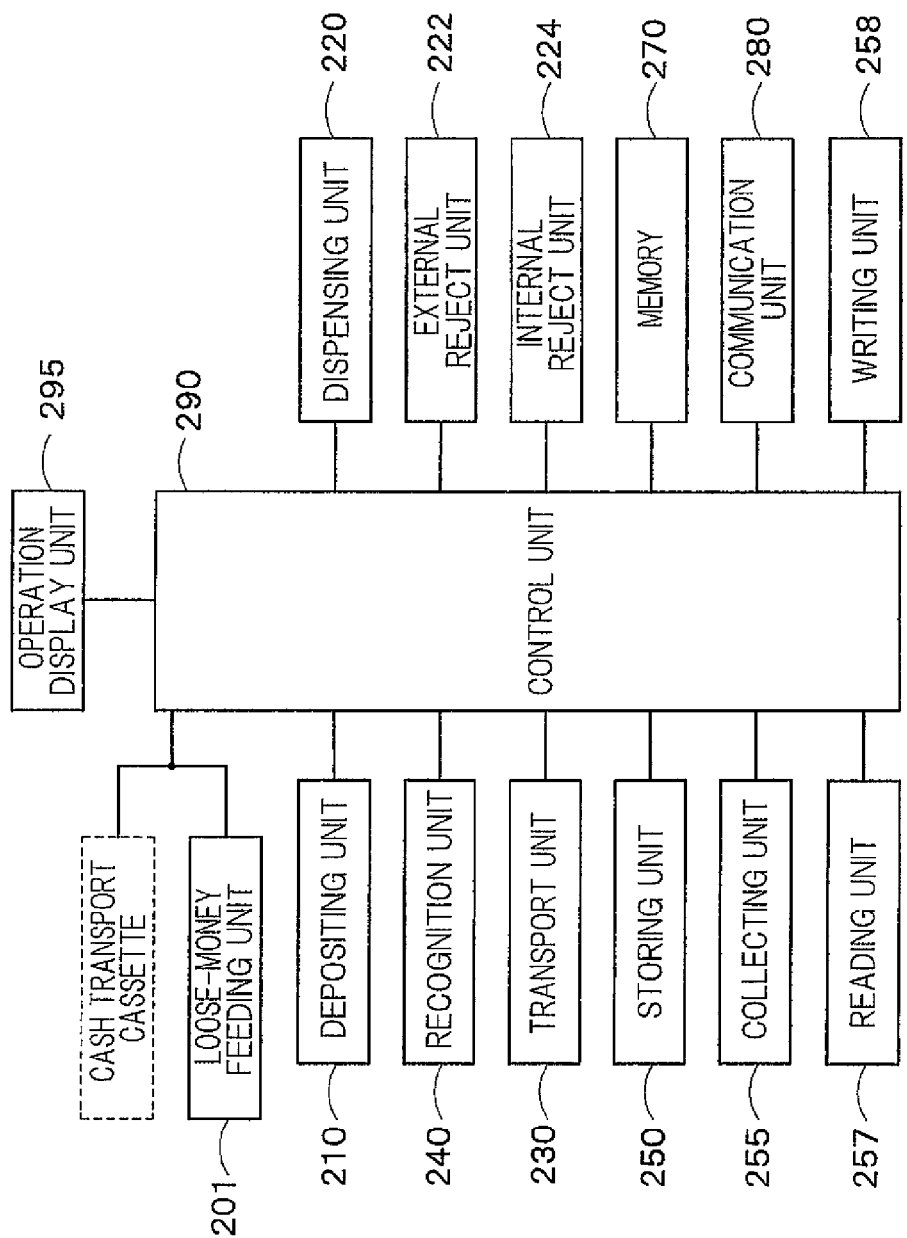
FIG. 7 is a block diagram showing a structural example of the cash accounting apparatus 21.

Herebelow, in order to differentiate constituent elements of the banknote accounting apparatus 22 and constituent elements of the coin accounting apparatus 23 from each other, a character "a" is added to a reference number of a constituent element of the banknote accounting apparatus 22, and a character "b" is added to a reference number of a constituent element of the coin accounting apparatus 23. Since the objects (a banknote and a coin) to be handled by the banknote accounting apparatus 22 and the coin accounting apparatus 23 differ from each other, the banknote accounting apparatus 22 and the coin accounting apparatus 23 differ from each other in concrete structures thereof. However, the basic block structure shown in FIG. 7 is common thereto. An operation display unit 295 is disposed any one of the banknote accounting apparatus 22 and the coin accounting apparatus 23, and is used in common to display information of both apparatuses.

Figure 8:
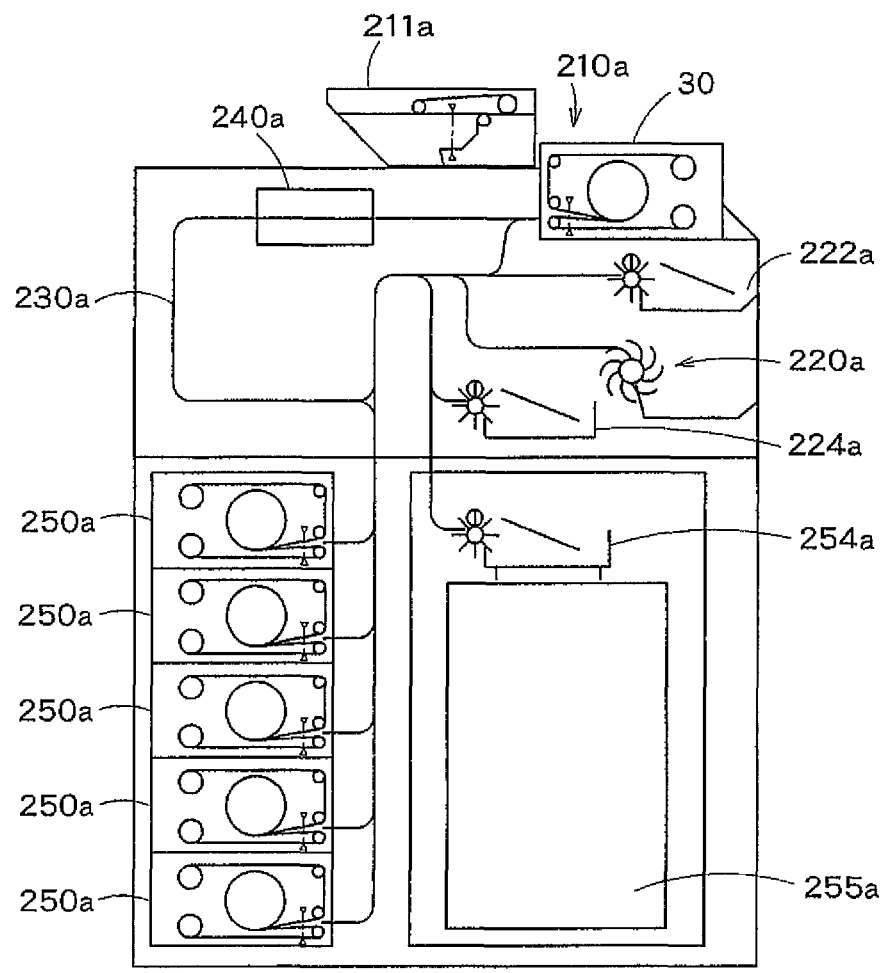
FIG. 8 is a sectional view showing an example of an inside structure of a banknote accounting apparatus 22 of the cash accounting apparatus 21.

FIG. 6 is a view showing an appearance of an example of the cash accounting apparatus 21. The cash accounting apparatus 21 includes the banknote accounting apparatus 22 and the coin accounting apparatus 23. The banknote accounting apparatus 22 is composed of a housing 200a, a depositing unit 210a, a dispensing unit 220a and an operation display unit 295. The depositing unit 210a is provided for depositing a banknote(s). The dispensing unit 220a is provided for dispensing a banknote(s). The deposing unit 210a is configured such that a loose-banknote feeding unit 211a for feeding loose banknotes or the cash transport cassette 30 can be selectively attached thereto. Thus, the depositing unit 210a can deposit loose banknotes without using the cash transport cassette 30, and can also deposit banknotes from the cash transport cassette 30. The dispensing unit 220a can dispense loose banknotes without using the cash transport cassette 30. When a front cover 201a is opened, there are disposed a collecting unit 255a and a storing unit 250a which are shown in FIG. 8.

The operation display unit 295 is configured to display conditions of the cash accounting apparatus 21, the cash settlement apparatus 11 and the cash transport cassette 30. In addition, an operator can input data through the operation display unit 295. The operation display unit 295 may be a display of a touch panel type, for example.

The coin accounting apparatus 23 is composed of a housing 200b, a depositing unit 210b and a drawer attaching unit 260 functioning as a dispensing unit 220b. The depositing unit 210b is provided for depositing a coin(s). The drawer attaching unit 260 is provided for dispensing a coin(s). The depositing unit 210b is configured such that loose coins can be put thereinto as they are, or the cash transport cassette 30 can be attached thereto. Thus, the depositing unit 210b can deposit loose coins without using the cash transport cassette 30, and can also deposit coins from the cash transport cassette 30. The drawer attaching unit 260 is configured such that a storing drawer 258b storing coins by denomination or the cash transport cassette 30 can be selectively attached thereto. Thus, the drawer attaching unit 260 can dispense coins without using the cash transport cassette 30, and can also dispense coins to the cash transport cassette 30.

FIG. 7 is a block diagram showing a structural example of the cash accounting apparatus 21. In addition to the depositing unit 210, the dispensing unit 220 and the operation display unit 295, the cash accounting apparatus 21 further includes a transport unit 230, a recognition unit 240, a storing unit 250, a collecting unit 255, a reading unit 257, a writing unit 258, an apparatus-external reject unit 222, an in-apparatus reject unit 224, a memory 270, a communication unit 280 and a control unit 290.

The depositing unit 210 of the cash accounting apparatus 21 is configured such that the loose-money feeding unit 201 or the cash transport cassette 30 can be selectively attached thereto. For example, when a clerk deposits loose money to the cash accounting apparatus 21, the loose-money feeding unit 201 is attached to the depositing unit 210. When a clerk deposits cash to the cash accounting apparatus 21 by using the cash transport cassette 30, the cash transport cassette 30, instead of the loose-money feeding unit 201, is attached to the depositing unit 210. Namely, the cash accounting apparatus 21 is configured such that the cash transport cassette 30, instead of the loose-money feeding unit 201, can be attached to and detached from the depositing unit 210.

The transport unit 230 transports cash having been put into the depositing unit 210 to the storing unit 250, or transports cash to be dispensed from the dispensing unit 220, from the storing unit 250. In addition, the transport unit 230 is configured to transport cash from the storing unit 250 to the cash transport cassette 30, or configured to transport cash from the cash transport cassette 30 to the storing unit 250.

The recognition unit 240 is configured to detect a denomination, an authenticity, a fitness, a version and an amount and so on of cash being transported by the transport unit 230. For example, the recognition unit 240 has a sensor such as a magnetic sensor, a fluorescent sensor, a metal thread sensor, a thickness sensor or an image sensor. In addition, the recognition unit 240 is configured to count an amount of cash by denomination.

The storing unit 250 is configured to store, by denomination, cash having been recognized by the recognition unit 240. When banknotes are stored, the storing unit 250 may be a stacking-type storing unit or a tape reeling-type storing unit.

In the storing unit 250, an amount of cash capable of being stored (storable amount) in the storing unit 250 is preset for each denomination. In the cash management system 1 in this embodiment, as described below, when there is performed a collecting operation in which a clerk transports sales proceeds of the cash settlement apparatus 11 to the cash accounting apparatus 21, the management unit 26 of the cash management apparatus 25 performs judgment or selection regarding a proper transport destination, such that an amount of cash stored in the cash accounting apparatus 21 does not exceed the storable amount.

The reading unit 257 is configured to read out information stored in the memory unit 35 disposed on the cash transport cassette 30. Meanwhile, the writing unit 258 is configured to write information to the memory unit 35 disposed on the cash transport cassette 30.

The memory 270 includes a ROM or a HDD storing various programs and data for controlling the cash accounting apparatus 21, and a RAM serving as a program loading area or a working area when a program is executed, and so on. The memory 270 stores information of cash (a denomination, an amount and so on) stored in the storing unit 250 and the cash transport cassette 30. Further, the memory 270 may store, by denomination, an amount of cash having been recognized by the recognition unit 240.

The communication unit 280 is communicably connected to other apparatuses (the cash settlement apparatus 11, the cash management apparatus 25, the POS management apparatus 28) constituting the cash handling system 1.

The control unit 290 is a processing unit configured to execute a program in the memory 270 to control the cash accounting apparatus 21 as a whole.

FIG. 8 is a sectional view showing an example of an inside structure of the banknote accounting apparatus 22 of the cash accounting apparatus 21. FIG. 8 shows a condition in which the cash transport cassette 30 is attached to the depositing unit 210a. Illustration of the operation display unit 295 is omitted in FIG. 8.

As shown in FIG. 8, when a clerk deposits a banknote(s) from the cash transport cassette 30 to the storing unit 250a, the clerk attaches the cash transport cassette 30 to the depositing unit 210a. The cash transport cassette 30 feeds out, one by one, banknotes included therein to the transport unit 230a. The transport unit 230a is configured to cause the fed banknotes to pass through the recognition unit 240a, and then configured to transport the banknotes to the storing unit 250a, a collecting/stacking unit 254a or the apparatus-external reject unit 222a. The recognition unit 240a is configured to recognize a denomination, an authenticity, a fitness, a version, an amount and so on of each of the banknotes being transported. The transport unit 230a is configured to store the banknotes by denomination into the storing units 250a, based on the recognition result by the recognition unit 240a.

When a banknote could not be recognized by the recognition unit 240 or a banknote was recognized as a counterfeit note, the transport unit 230a is configured to dispense the banknote to the apparatus-external reject unit 222a.

On the other hand, when a banknote(s) is dispensed, the storing unit 250a feeds banknotes, one by one, to the transport unit 230a, in order that the banknotes are transported to the cash transport cassette 30. The transport unit 230a transports the fed banknotes to the cash transport cassette 30. Thus, the banknote accounting apparatus 22 can dispense the banknotes to be loaded into the cash settlement apparatus 11, to the cash transport cassette 30. In the course of transporting the banknotes, when the sensor 242a detects abnormal transportation state such as an overlapped state, a chained state or a skewed state, the transport unit 230a transports the banknote(s) to the apparatus-external reject unit 224a.

In this manner, the banknote accounting apparatus 22 is configured to dispense a banknotes to be loaded into the cash settlement apparatus 11, to the cash transport cassette 30, and configured to deposit a banknote having been collected from the cash settlement apparatus 11 from the cash transport cassette 30. Namely, the banknote accounting apparatus 22 is configured such that a banknote deposited thereinto can be reused as a banknote to be dispensed.

Figure 9:
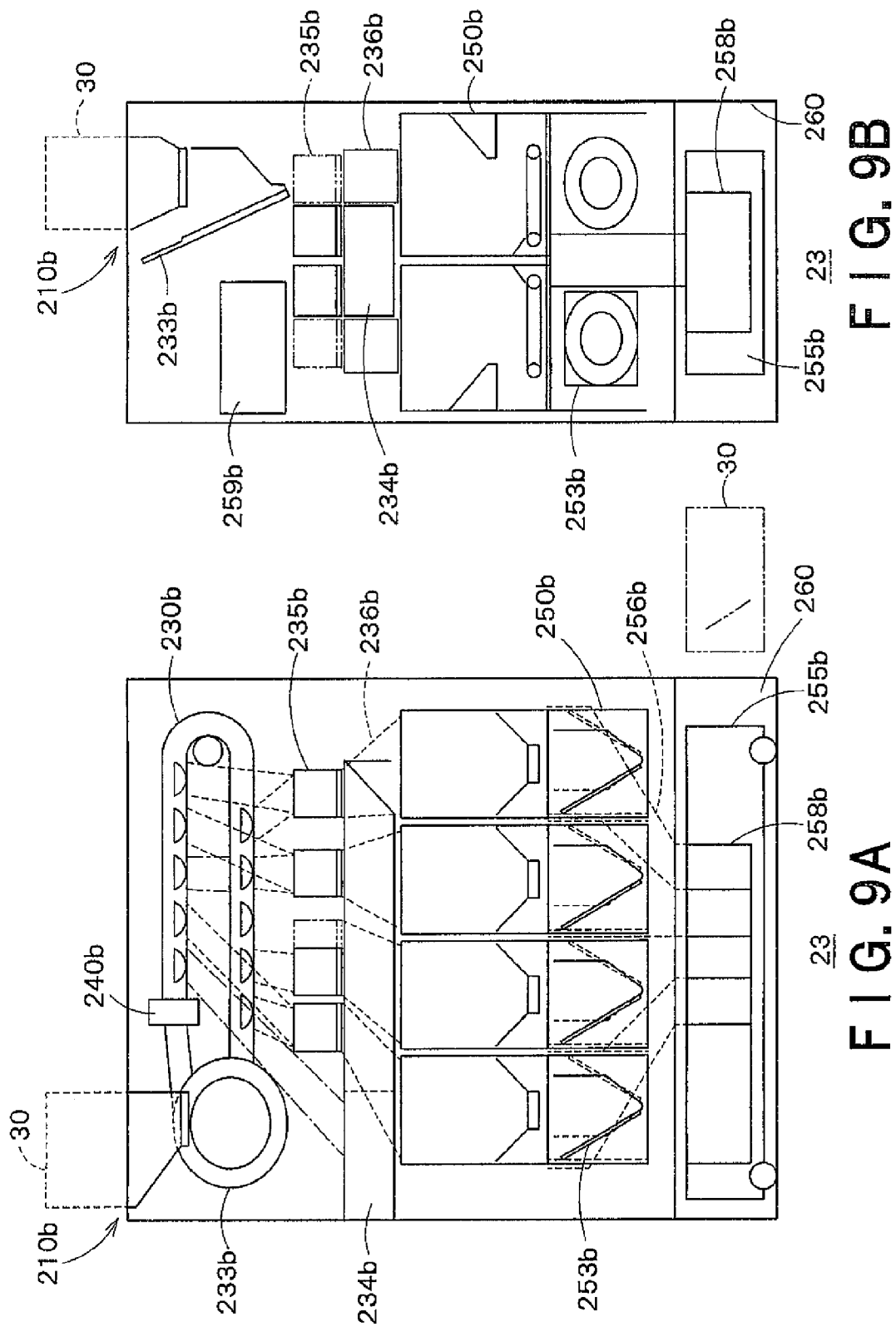
FIG. 9 is a sectional view showing an example of an inside structure of a coin accounting apparatus 23 of the cash accounting apparatus 21.

FIG. 9A and FIG. 9B are sectional views showing an example of an inside structure of the coin accounting apparatus 23 of the money accounting apparatus 21. FIG. 9A is the sectional view of the coin accounting apparatus 23 when viewed from a lateral side, and FIG. 9B is the sectional view of the coin accounting apparatus 23 when viewed from a front side.

The coin accounting apparatus 23 has the depositing unit 210b, and is configured to deposit thereinto a coin having been collected from the money settlement apparatus 11, from the cash transport cassette 30. The coin accounting apparatus 23 includes the drawer attaching unit 260 to which the collecting unit 255b and the cash transport cassette 30 can be attached. When the cash transport cassette 30 is attached to the drawer attaching unit 260, coins to be loaded into the money settlement apparatus 11 can be sorted by denomination, and the sorted coins can be dispensed to the cash transport cassette 30.

When the cash transport cassette 30 is attached to the depositing unit 210b, the coin accounting apparatus 23 can deposit a coin, which has been collected from the cash settlement apparatus 11, from the cash transport cassette 30. When a clerk attaches the cash transport cassette 30 to the depositing unit 210b, the cash transport cassette 30 deposits a coin to the feeding unit 233b. At this time, money may be put thereinto in a denomination mixed state.

The disk-type feeding unit 233b is configured to feed, one by one, coins having been put into the depositing unit 210b, to the transport unit 230b. The transport unit 230b is configured to cause the fed coins to pass through the recognition unit 240b, and then configured to transport the coins to an escrow unit 235b. The escrow units 235b are disposed for respective denominations, and are configured to temporarily store a coin therein.

The recognition unit 240b is configured to recognize a denomination, an authenticity, a fitness, a version, an amount and so on of each of the coins being transported. The transport unit 230b is configured to sort the coins by denomination based on the recognition result by the recognition unit 240b, and configured to transport a coin to the escrow unit 235b of a corresponding denomination.

Each of the escrow units 235b communicate with the storing unit 250b of a corresponding denomination through a chute 236b. After all the coins having been inputted were stored in the escrow units 235b, a coin is stored into the storing unit 250 of a corresponding denomination.

When a coin was recognized as a reject coin by the recognition unit 240b, the transport unit 230b may transport the reject coin to the reject unit 234b.

The coin accounting apparatus 23 can dispense a coin(s) to be loaded into the cash settlement apparatus 11, to the cash transport cassette 30. In this case, coins are dispensed from the storing units 250b to the cash transport cassette 30 through the chutes 256b. At this time, the coins having been dispensed to the cash transport cassette 30 may be in a denomination mixed state.

In this manner, the coin accounting apparatus 23 can store a coin from the cash transport cassette 30 into the storing unit 250b, and can reversely dispense a coin having been stored into the storing unit 250b to the cash transport cassette 30.

The cash transport cassette 30 includes the memory unit 35 which at least stores cassette ID information for specifying the cash transport cassette 30. When there are the plurality of cash transport cassettes 30 in the cash handling system 1, the cash transport cassettes 30 have cassette ID information that are different from each other. Thus, the cash settlement apparatus 11 and the cash accounting apparatus 21 can specify a cash transport cassette 30. The cassette ID information may be a unique number set to each of the plurality of cash transport cassettes 30. The memory unit 35 may store information such as a denomination, an amount and so on of cash stored in the cash transport cassette 30 according to need.

(Operation of Cash Handling System 1)

Next, a concrete operation of the cash handling system 1 in this embodiment is described. A sum of cash in each cash settlement apparatus 11, a sum of cash in the cash accounting apparatus 21, a sum of cash deposited into or dispensed from each cash settlement apparatus 11 and a sum of cash having been loaded or collected between the cash accounting apparatus 21 and each cash settlement apparatus 11 are managed by the respective apparatuses 11 and 12 as well as managed by the cash management apparatus 25 as a whole. The plurality of cash settlement apparatuses 11 respectively has unique ID information so as to be differentiated from each other, and each memory 170 of each of the cash settlement apparatuses 11 stores the ID information. Similarly, the plurality of cash accounting apparatuses 21 respectively have unique ID information so as to be differentiated from each other, and each memory 270 of each of the cash accounting apparatuses 21 stores the ID information. In addition, the cash management apparatus 25 also recognizes the ID information of each cash settlement apparatus 11 and each cash accounting apparatus 21.

For example, when there are provided the thirty cash settlement apparatuses 11 in total, each cash settlement apparatus 11 has ID information Xk (k=integer from 1 to 30). In the following description, the cash settlement apparatus having the ID information of Xk is referred to as "cash settlement apparatus 11 (Xk)". For example, the cash settlement apparatus 11 having the ID information of X1 is referred to as "cash settlement apparatus 11 (X1)".

In addition, when there are provided the three cash accounting apparatuses 21 in total, each cash settlement apparatus 21 has ID information YI (I=integer from 1 to 3). In the following description, the cash accounting apparatus having the ID information of YI is referred to as "cash accounting apparatus 21 (YI)". For example, the cash accounting apparatus 21 having the ID information of Y1 is referred to as "cash accounting apparatus 21 (Y1)".

Further, in the following description, it is supposed that there are prepared the cash transport cassettes 30 the number of which is equal to that of the cash settlement apparatuses 11. In addition, each cash transport cassette 30 is related to any one of the thirty cash settlement apparatuses 11. For example, it is supposed that there are prepared the thirty cash transport cassettes 30 each having cassette ID information of Zk (k=integer from 1 to 30), and that the cash transport cassette 30 having the cassette ID information of Zk is related to the cash settlement apparatus 11 (Xk). That it to say, the cash transport cassette 30 having the ID information of Zk is exclusively used by the cash settlement apparatus 11 (Xk). In the following description, the cash transport cassette 30 having the cassette ID information of Zk is referred to as "cash transport cassette 30 (Zk)". For example, the cash transport cassette 30 having the cassette ID information of Z1 is referred to as "cash transport cassette 30 (Z1)".

In the below respective processes, communication between each cash settlement apparatus 11 and the cash accounting apparatus 21 is performed via the cash management apparatus 25. However, it is a matter of course that each cash settlement apparatus 11 and the cash accounting apparatus 21 can directly communicate with each other.

In the below concrete operation example, the cash handling system 1 can be applied both to a banknote and to a coin. For example, when a banknote is handled, the banknote settlement apparatus 12 of the cash settlement apparatus 11 may be used, and the banknote accounting apparatus 22 of the cash accounting apparatus 21 may be used. In addition, a cash transport cassette for banknote (either a stacking type or a tape reeling type will do) may be used as the cash transport cassette 30. On the other hand, when a coin is handled, the coin settlement apparatus 13 of the cash settlement apparatus 11 may be used, and the coin accounting apparatus 23 of the cash accounting apparatus 21 may be used. Herebelow, a banknote and a coin are expressed as "cash" for the sake of convenience, the term "cash" can be replaced with either "banknote" or "coin".

In addition, in the following concrete operation example, it is supposed that a storable amount of the storing unit 250 of each cash accounting apparatus 21 is three hundred, regardless of denomination, for convenience of explanation.

First Operational Embodiment

Firstly, there is described an embodiment of an operation in which a clerk collects sales proceeds stored in the cash settlement apparatus 11 (X1) of the respective cash settlement apparatuses 11 into the cash accounting apparatus 21. Herein, for convenience of explanation, it is supposed that sales proceeds stored in the cash settlement apparatus 11 (X1) and cash stored in each cash accounting apparatus 21 are composed of cash of only one denomination. In addition, it is supposed that ninety cash are stored in the cash settlement apparatus 11 (X1), and that all the ninety cash are collected by the cash transport cassette 30 (Z1). In addition, it is supposed that the three cash accounting apparatuses 21 (Y1) to 21 (Y3) have already stored two hundred fifty cash, two hundred cash and forty cash, respectively.

In the below described embodiment, the depositing judgment unit 26A of the management unit 26 is configured to, when the cash transport cassette 30 is attached to the cash settlement apparatus 11, judge whether cash in the cash settlement apparatus 11 to be received by the cash transport cassette 30 can be deposited into the cash accounting apparatus 21 or not.

(Collecting Process)

Figure 10:
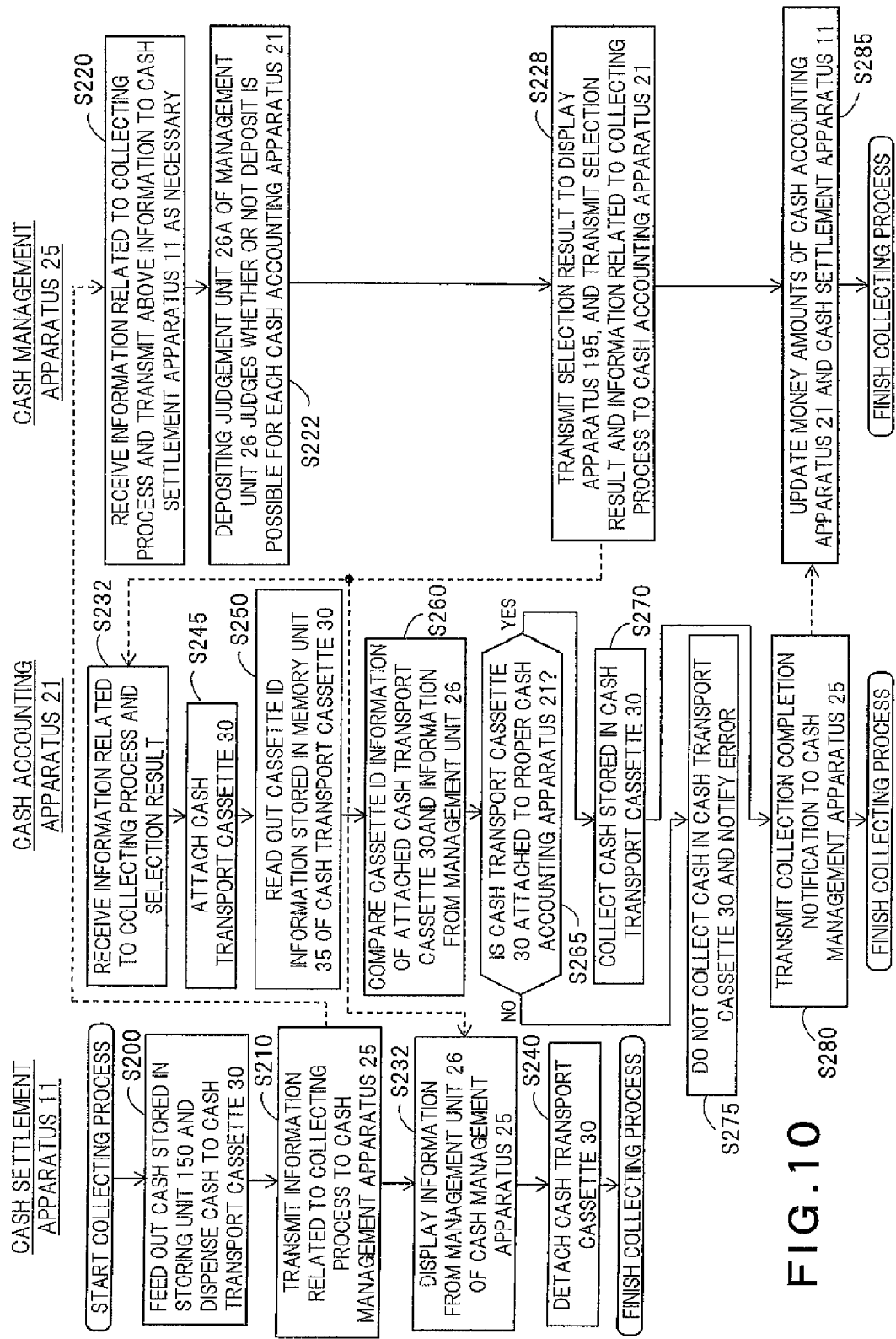
FIG. 10 is a flowchart showing a collecting operation in a first operational embodiment.

A collecting process in this embodiment is described with reference to FIGS. 10 and 11. FIG. 10 is a flowchart showing an operation of the collecting process in the cash management system 1 according to this embodiment.

In the first place, when a clerk selects start of the collecting process in the cash settlement apparatus 11 (X1), the cash accounting apparatus 21 or the cash management apparatus 25, the cash settlement apparatus 11 (X1) feeds out all the ninety cash stored in the storing unit 150 and dispenses the cash to the cash transport cassette 30 (Z1) (S200). In addition, the reading unit 157 of the cash settlement apparatus 11 (X1) reads out the cassette ID information stored in the memory unit 35 of the cash transport cassette 30 (Z1).

The cash settlement apparatus 11 (X1) relates its own ID information (=X1), the cassette ID Information (=Z1) of the cash transport cassette 30 (Z1) storing the cash to be collected, denomination information of the cash to be collected, and amount information thereof, and transmits the information to the cash accounting apparatus 21 of the back office 20 (S210). Herebelow, the ID information of the cash settlement apparatus 11, the cassette ID information of the cash transport cassette 30 (Z1) storing the cash to be collected, the denomination information of the cash to be collected and the amount information thereof are referred to as "information related to collecting process".

The cash management apparatus 25 installed in the back office 20 receives the information related to collecting process from the cash settlement apparatus 11 (X1), and stores the information related to collecting process. The writing unit 158 of the cash settlement apparatus 11 (X1) may write the information related to collecting process to the memory unit 35 of the cash transport cassette 30 (Z1).

Based on the information related to collecting process from the cash settlement apparatus 11 (X1), the depositing judgment unit 26A of the management unit 26 of the cash management apparatus 25 judges whether the cash to be collected received in the cash transport cassette 30 (Z1) can be deposited into the respective cash accounting apparatuses 21 (Y1) to 21 (Y3), respectively (S222).

To be specific, the depositing judgment unit 26A firstly adds the amount of the cash already stored in the cash accounting apparatus 21 (Y1), i.e., two hundred fifty, and the amount of the cash to be collected received in the cash transport cassette 30 (Z1), i.e., ninety. Then, the depositing judgment unit 26A judges whether the calculated addition result exceeds the storable amount of the cash accounting apparatus 21. In this case, the addition result is three hundred forty, which exceeds the storable amount of the cash accounting apparatus 21 (Y1), i.e., three hundred. Thus, a result of the depositing judgment for the cash accounting apparatus 21 (Y1) is "NG".

Similarly, the depositing judgment unit 26A performs the depositing judgment for the cash accounting apparatus 21 (Y2) and the cash accounting apparatus 21 (Y3). FIG. 11 shows the results of judgment performed in this manner. These judgment results are related to the cassette ID information of the cash transport cassette 30 (Z1), and are then stored in the management unit 26. In FIG. 11, the row entitled "Money Amount upon Judgment" represents an amount of cash having been already stored in each of the cash settlement apparatuses 21 (Y1) to 21 (Y3), when the depositing judgment unit 26A performs the judgment.

Then, the information related to the results of judgment performed by the depositing judgment unit 26A of the management unit 26 is transmitted to the display apparatus 195 (S228). As shown in FIG. 10, the information may be transmitted to the respective cash accounting apparatuses 21. At this time, the aforementioned information related to collecting process may be simultaneously transmitted to the respective cash accounting apparatuses 21.

The display apparatus 195 displays the judgment results transmitted from the management unit 26 (S232). For example, the judgment result "OK" or "NG" for each of the cash accounting apparatuses 21 (Y1) to 21 (Y3) is displayed. Thus, the clerk can obtain information related to the cash accounting apparatus 21 into which the cash to be collected received in the cash transport cassette 30 (Z1) can be deposited.

Then, the clerk detaches the cash transport cassette 30 (Z1) from the cash settlement apparatus 11 (X1) (S240). Thereafter, the clerk transports the cash transport cassette 30 (Z1) to the cash accounting apparatus 21. As described above, the clerk has obtained the information related to the cash accounting apparatus 21 into which the cash to be collected received in the cash transport cassette 30 (Z1) can be deposited. Thus, the clerk can transport the cash transport cassette 30 (Z1) to any one of the cash accounting apparatuses 21 (Y2) and 21 (Y3) without any hesitation.

When the clerk attaches the cash transport cassette 30 to the cash accounting apparatus 21 (S245), the reading unit 257 of the cash accounting apparatus 21 reads out the information (cassette ID information and information related to collecting process) stored in the memory unit 35 of the cash transport cassette 30 (Z1) (S250). The read-out cassette ID information is transmitted, together with the ID information of the cash accounting apparatus 21 to which the cash transport cassette 30 (Z1) is attached, to the comparison unit 27 of the cash management apparatus 25.

The comparison unit 27 compares the result of judgment performed by the depositing judgment unit 26A of the management unit 26 and the cassette ID information read out from the memory unit 35 of the cash transport cassette 30 (Z1) (S260). To be specific, the comparison unit 27 performs the comparison process to confirm whether the ID information of the cash accounting apparatus 21 to which the cash transport cassette 30 (Z1) is attached corresponds to the cash accounting apparatus 21 that is judged as "OK" for the cash transport cassette 30 (Z1) in the result of judgment by the depositing judgment unit 26A. Thus, it can be judged whether the cash transport cassette 30 (Z1) is properly attached to any one of the cash accounting apparatuses 21 (Y2) and 21 (Y3) which is judged as "OK" in the judgment result.

When it is judged that the cash transport cassette 30 (Z1) is attached to the proper cash accounting apparatus 21 (YES in S265), the cash accounting apparatus 21 collects the cash stored in the cash transport cassette 30 (Z1) (S270). The collected cash is stored into the storing unit 250 of the cash accounting apparatus 21.

When it is judged by the comparison unit 27 that cash transport cassette 30 (Z1) is not attached to the proper cash accounting apparatus 21 (NO in S265), the cash accounting apparatus 21 does not collect the cash in the cash transport cassette 30 (Z1), and notifies the clerk of the error (S275). The error may be displayed on the operation display unit 295. The clerk notified of the error eliminates the error, by attaching the cash transport cassette 30 (Z1) to the proper cash accounting apparatus 21 or the like.

After the collection of the cash has been finished, the cash accounting apparatus 21 transmits a collection completion notification to the cash management apparatus 25 (S280).

Upon receipt of the collection completion notification, the cash management apparatus 25 updates the money amounts of the cash settlement apparatus 11 (X1) and the cash accounting apparatus 21 to which the cash transport cassette 30 (Z1) is attached (S285). Thus, a series of collecting processes related to the cash settlement apparatus 11 (X1) are completed. As to the other cash settlement apparatuses 11 (X2) to 11 (X30), by repeating the above steps S200 to S285, the collecting process can be performed.

As described above, the cash handling system 1 according to this embodiment includes: the management unit 26 that is communicably connected to the cash settlement apparatus 11 and the cash accounting apparatus 21, the management unit 26 including the depositing judgment unit 26A configured to judge, when the cash transport cassette 30 is attached to the cash settlement apparatus 11, whether cash in the cash settlement apparatus 11 to be received by the cash transport cassette 30 can be deposited into the cash accounting apparatus 21; and the display apparatus 195 that is communicably connected to the management unit 26, the display apparatus 195 configured to display information from the management unit 26. Thus, a clerk can obtain information related to the cash accounting apparatus 21 into which cash to be collected received by the cash transport cassette 30 from the specific cash settlement apparatus 11 can be deposited. Therefore, the clerk can transport the cash to be collected in the cash transport cassette 30 to the proper cash accounting apparatus 21 without any hesitation. Thus, a time period required for collecting the sales proceeds can be reduced.

In addition, the cash handling system 1 according to this embodiment further includes the comparison unit 27 that is communicably connected to the management unit 26, the comparison unit 27 configured to compare, when the cash transport cassette 30 is attached to the cash accounting apparatus 21, the cassette ID information read-out by the reading unit 257 of the cash accounting apparatus 21 and the information from the management unit 26. Thus, it can be prevented that the cash transport cassette 30 storing cash to be collected is mistakenly attached to the improper cash accounting apparatus 21.

In this embodiment, there has been described the example in which the plurality of cash accounting apparatuses are provided. However, even if the only one cash accounting apparatus 21 is provided, the cash management system 1 according to this embodiment can develop an effect. For example, by means of the cash management system 1 according to this embodiment, a clerk can obtain from the display apparatus 195 information related to whether cash to be collected received by the cash transport cassette 30 from the specific cash settlement apparatus 11 can be deposited into the cash accounting apparatus 21. Thus, when the storing unit 250 of the cash accounting apparatus 21 is full, it can be prevented that a clerk transports the cash to be collected to the cash accounting apparatus 21 in vain. Further, even when an accidental event occurs while a clerk is bringing the cash transport cassette 30 from the cash settlement apparatus 11 to the cash accounting apparatus 21, it can be prevented that the improper cash transport cassette 30 is attached to the cash accounting apparatus 21.

In addition, in this embodiment, there has been described the example in which the comparison unit 27, which compares the cassette ID information read-out by the reading unit 257 of the cash accounting apparatus 21 and the information from the management unit 26, is provided on the cash management apparatus 25. However, the present invention is not limited thereto, and the comparison unit 27 may be provided on the cash accounting apparatus 21. For example, the control unit 290 of the cash accounting apparatus 21 may have the function as the comparison unit 27. In this case, the control unit 290 is configured to compare the information such as information related to the judgment results and the information related to collecting process, which is transmitted from the management unit 26 in the step S228, and the cassette ID information read-out by the reading unit 257.

Second Operational Embodiment

Next, there is described another embodiment of an operation in which a clerk collects sales proceeds stored in the cash settlement apparatus 11 (X1) of the respective cash settlement apparatuses 11 into the cash accounting apparatus 21.

In this embodiment, the selection unit 26B of the management unit 26 is configured to, when the cash transport cassette 30 is attached to the cash settlement apparatus 11, select one of the cash accounting apparatuses 21 into which cash in the cash settlement apparatus 11 received by the cash transport cassette 30 is to be deposited, based on information from the depositing judgment unit 26A. In this embodiment, the other structures are substantially the same as those of the aforementioned first embodiment. Thus, in the below described embodiment, the same units as those of the above first embodiment are shown by the same reference numbers and detailed description thereof is omitted.

Similarly to the above-described first embodiment, also in this embodiment, it is supposed that ninety cash are stored in the cash settlement apparatus 11 (X1), and that all the ninety cash are collected by the cash transport cassette 30 (Z1). In addition, it is supposed that the three cash accounting apparatuses 21 (Y1) to 21 (Y3) have already stored two hundred fifty cash, two hundred cash and forty cash, respectively.

(Collecting Process)

Figure 12:
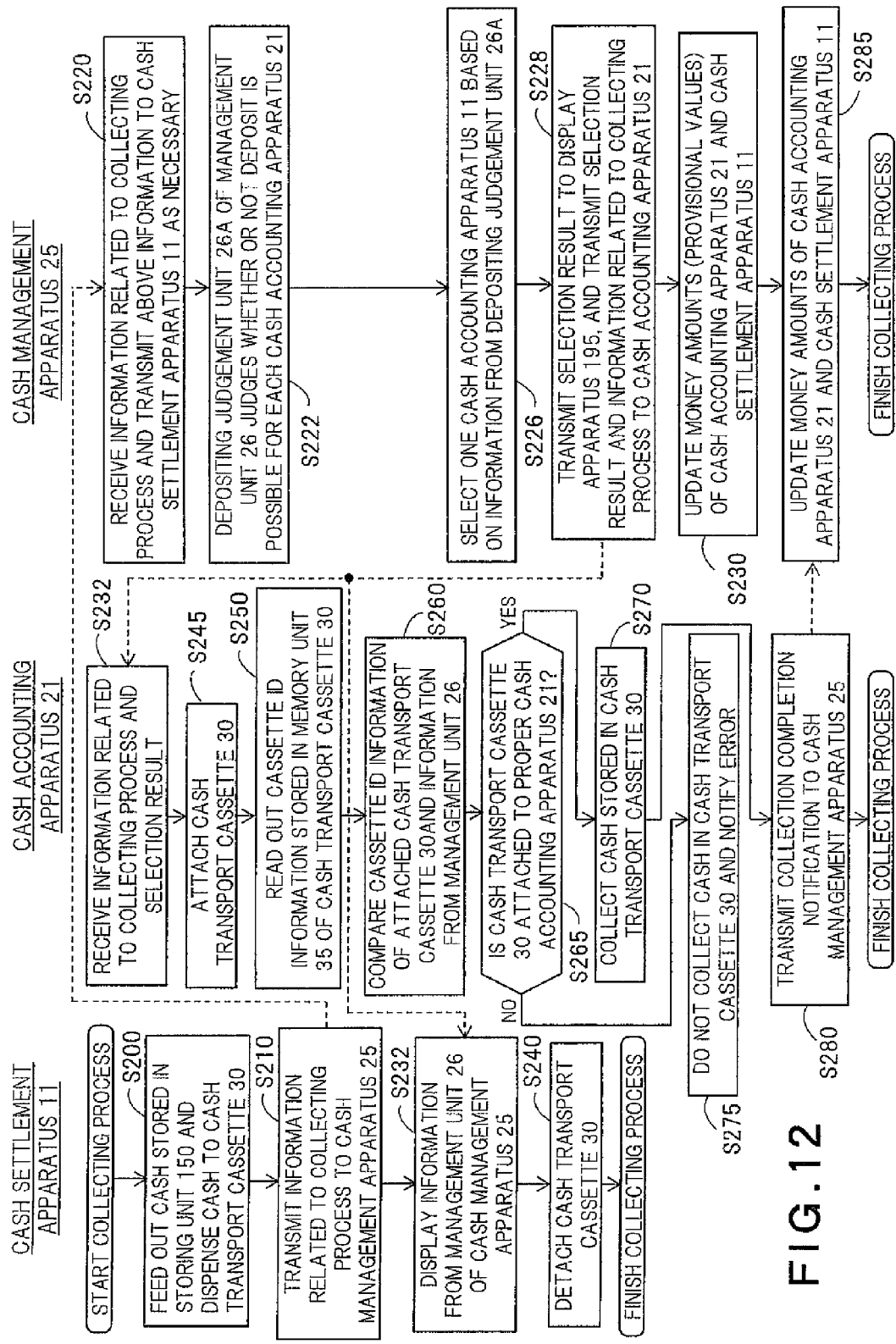
FIG. 12 is a flowchart showing the collecting operation in a second operational embodiment.

A collecting process in this embodiment is described with reference to FIGS. 12 and 13. FIG. 12 is a flowchart showing an operation of the collecting process in the cash management system 1 according to this embodiment.

In the first place, when a clerk selects start of the collecting process in the cash settlement apparatus 11 (X1), the cash accounting apparatus 21 or the cash management apparatus 25, the cash settlement apparatus 11 (X1) feeds out all the ninety cash stored in the storing unit 150 and dispenses the cash to the cash transport cassette 30 (Z1) (S200). Since the operation from the step S200 to the step S222 is the same as the operation from the step S200 to the step S222 in the first embodiment shown in FIG. 10, detailed description thereof is omitted.

FIG. 13 shows results of judgment performed by the depositing judgment unit 26A of the management unit 26 in the step S222. These judgment results are related to the cassette ID information of the cash transport cassette 30 (Z1), and are then stored in the management unit 26. In this embodiment, there may be simultaneously calculated a money amount of the cash accounting apparatus 21 which is a money amount (hereinafter referred to as "imaginary money amount") calculated on the assumption that cash to be collected has been deposited from the cash settlement apparatus 11 (X1) into the cash accounting apparatus 21 that was judged as "OK" upon judgment by the depositing judgment unit 26A. In FIG. 13, the calculated imaginary money amounts are shown in parentheses.

Then, based on the information from the depositing judgment unit 26A, the selection unit 26B of the management unit 26 selects one of the cash accounting apparatuses 21 into which the cash to be collected received in the cash transport cassette 30 (Z1) is to be deposited (S226). Various references can be considered as a selection reference at this time. For example, there can be considered a selection reference based on which the cash accounting apparatus 21 having the minimum difference between the imaginary money amount and the storable amount is selected among the cash accounting apparatuses 21 that are judged as "OK".

The imaginary money amount of the cash accounting apparatus 21 (Y2) is two hundred ninety. Thus, a difference between the imaginary money amount and the storable amount is ten. On the other hand, the imaginary money amount of the cash accounting apparatus 21 (Y3) is one hundred thirty. Thus, a difference between the imaginary money amount and the storable amount is one hundred seventy. Therefore, the selection unit 26B selects the cash accounting apparatus 21 (Y2) as the one cash accounting apparatus 21 into which the cash to be collected received in the cash transport cassette 30 (Z1) is to be deposited (see FIG. 13).

Then, information related to the result of selection performed by the selection unit 26B of the management unit 26 is transmitted to the display apparatus 195 (S228). As shown in FIG. 12, the information may be transmitted to the respective cash accounting apparatuses 21. At this time, information related to collecting process may be simultaneously transmitted to the respective cash accounting apparatuses 21.

In addition, after the cash accounting apparatus 21 (Y2) has been selected by the selection unit 26B, the cash management apparatus 25 may provisionally update the money amount of the selected cash accounting apparatus 21 (Y2) (S230). Namely, the money amount of the cash accounting apparatus 21 (Y2) may be updated to two hundred ninety which is a value obtained by adding the amount of the cash to be collected from the cash settlement apparatus 11 (X1), i.e., ninety, to the current money amount of two hundred. Thus, when the depositing judgment unit 26A performs judgment as to whether deposit is possible or impossible for the other cash settlement apparatuses 11 before the cash to be collected is actually deposited from the cash settlement apparatus 11 (X1) into the cash accounting apparatus 21 (Y2), the depositing judgment unit 26A can perform proper judgment.

The display apparatus 195 displays the selection result transmitted from the management unit 26 (S232). For example, there is described the selection result in which the cash to be collected stored in the cash transport cassette 30 (Z1) is transported to the cash accounting apparatus 21 (Y2). Thus, the clerk can obtain information related to the cash accounting apparatus 21 into which the cash to be collected received in the cash transport cassette 30 (Z1) is to be deposited.

Then, the clerk detaches the cash transport cassette 30 (Z1) from the cash settlement apparatus 11 (X1) (S240). Thereafter, the clerk transports the cash transport cassette 30 (Z1) to the cash accounting apparatus 21 (Y2).

When the clerk attaches the cash transport cassette 30 to the cash accounting apparatus 21 (S245), the reading unit 257 of the cash accounting apparatus 21 reads out the information (cassette ID and information related to collecting process) stored in the memory unit 35 of the cash transport cassette 30 (Z1) (S250). The read-out cassette ID information, together with the ID information of the cash accounting apparatus 21 to which the cash transport cassette 30 (Z1) is attached, is transmitted to the comparison unit 27 of the cash management apparatus 25.

The comparison unit 27 compares the result of selection performed by the selection unit 26B of the management unit 26 and the cassette ID information read-out from the memory unit 35 of the cash transport cassette 30 (Z1). To be specific, the comparison unit 27 judges whether the ID information of the cash accounting apparatus 21 to which the cash transport cassette 30 (Z1) is attached corresponds to the ID information (=Y2) of the cash accounting apparatus 21 that has been selected by the selection unit 26B or not. Thus, it can be judged whether the cash transport cassette 30 (Z1) is properly attached to the selected cash accounting apparatus 21 (Y2) or not.

When it is judged that the cash transport cassette 30 (Z1) is attached to the proper cash accounting apparatus 21 (Y2) (YES in S265), the cash accounting apparatus 21 (Y2) collects the cash store in the cash transport cassette 30 (Z1) (S270). The collected cash is stored into the storing unit 250 of the cash accounting apparatus 21 (Y2).

When it is judged by the comparison unit 27 that the cash transport cassette 30 (Z1) is not attached to the proper cash accounting apparatus 21 (Y2) (NO in S265), the cash accounting apparatus 21 does not collect the cash in the cash transport cassette 30 (Z1), and notifies the clerk of the error (S275). The error may be displayed on the operation display unit 295. At this time, based on the information stored in the management unit 26, the ID information of the cash accounting apparatus 21 to which the cash transport cassette 30 (Z1) is to be attached may be displayed on the operation display unit 295. The clerk notified of the error eliminates the error, by attaching the cash transport cassette 30 (Z1) to the proper cash accounting apparatus 21 (Y2) or the like.

After the collection of the cash has been finished, the cash accounting apparatus 21 transmits a collection completion notification to the cash management apparatus 25 (S280).

Upon receipt of the collection completion notification, the cash management unit 25 updates the money amounts of the cash settlement apparatus 11 (X1) and the cash accounting apparatus 21 to which the cash transport cassette 30 (Z1) is attached (S285). Thus, a series of collecting processes related to the cash settlement apparatus 11 (X1) are completed. As to the other cash settlement apparatuses 11 (X2) to 11 (X30), by repeating the above steps S200 to S285, the collecting process can be performed.

As described above, the management unit 26 of the cash handling system 1 according to this embodiment further includes the selection unit 26B configured to, when the cash transport cassette 30 is attached to the cash settlement apparatus 11, select one of the cash accounting apparatuses 21 into which the cash in the cash settlement apparatus 11 received by the cash transport cassette 30 is to be deposited, based on the information from the depositing judgment unit 26A. Thus, a clerk can transport cash to be collected from the specific cash settlement apparatus 11 to the optimum cash accounting apparatus 21 without any hesitation. Thus, a time period required for collecting sales proceeds can be further reduced.

In this embodiment, there has been described the example in which the selection unit 26B selects the cash accounting apparatus 21 which has the minimum difference between the imaginary money amount and the storable amount. However, a concrete selection reference of the selection unit 26B is not particularly limited. For example, the selection unit 26B may select the cash accounting apparatus 21 which has the maximum difference between the imaginary money amount and the storable amount. Alternatively, the selection unit 26B may select the cash accounting apparatus 21 which has such a difference between the imaginary money amount and the storable amount that is closest to a preset value.

Third Operational Embodiment

Next, there is described an embodiment of an operation in which a clerk collects sales proceeds stored in the cash settlement apparatuses 11 (X1) to 11 (X3) of the respective cash settlement apparatuses 11 into the cash accounting apparatus 21.

In this embodiment, there is described a case in which, after the operation of the management unit 26 has been performed for the cash settlement apparatus 11 (X1), an operation of the management unit 26 is performed for the cash settlement apparatus 11 (X2) and the cash settlement apparatus 11 (X3), before cash to be collected is actually deposited from the cash settlement apparatus 11 (X1) into the cash accounting apparatus 21. In the below described embodiment, the same units as those of the above first embodiment and the second embodiment are shown by the same reference numbers and detailed description thereof is omitted.

It is supposed that the cash settlement apparatuses 11 (X1) to (X3) store ninety cash, forty cash and one hundred twenty cash, respectively, and that all the stored cash are collected by the corresponding cash transport cassettes 30 (Z1) to (Z3). In addition, it is supposed that the three cash accounting apparatuses 21 (Y1) to 21 (Y3) have already stored two hundred fifty cash, two hundred cash and forty cash, respectively.

(Collecting Process)

A collecting process in this embodiment is described herebelow with reference to FIG. 14. Since an operation of the cash management apparatus 25 for each of the cash settlement apparatuses 11 is substantially the same as that of the second embodiment shown in FIG. 12, the flowchart showing in FIG. 12 is suitably referred to also in this embodiment.

In the first place, when a first clerk selects start of the collecting process in the cash settlement apparatus 11 (X1), the cash settlement apparatus 11 (X1) feeds out all the ninety cash stored in the storing unit 150, and dispenses the cash to the cash transport cassette 30 (Z1) (S200). Thereafter, similarly to the aforementioned second embodiment, the cash accounting apparatus 21 (Y2) is selected as the one cash accounting apparatus 21 into which the cash to be collected received in the cash transport cassette 30 (Z1) is to be deposited (S226). Then, information related to the selection result is displayed on the display apparatus 195 of the cash settlement apparatus 11 (X1) (S228).

FIG. 14 shows results of judgment performed by the depositing judgment unit 26A in this embodiment and results of selection performed by the selection unit 26B in this embodiment. The judgment results and the selection results are related to the cassette ID information of the cash transport cassette 30 (Z1), and are then stored in the management unit 26. As shown in FIG. 14, the row entitled "X1" shows the same results as those of the second embodiment shown in FIG. 13.

Thereafter, the money amount of the cash accounting apparatus 21 (Y2), which is selected for the cash settlement apparatus 11 (X1), is provisionally updated (S230). Namely, the money amount of the cash accounting apparatus 21 (Y2) is updated to two hundred ninety which is a value obtained by adding the amount of cash to be collected from the cash settlement apparatus 11 (X1), i.e., ninety, to the current money amount of two hundred. In FIG. 14, the row entitled "Money Amount upon Judgment" of the rows of "X2" shows the provisionally updated money amounts of the respective cash accounting apparatus 21 (Y1) to (Y3).

Then, when a second clerk selects start of the collecting process in the cash settlement apparatus 11 (X2), the cash settlement apparatus 11 (X2) feeds out all the forty cash stored in the storing unit 150, and dispenses the cash to the cash transport cassette 30 (Z2) (S200). After that, based on the provisionally updated money amounts of the respective cash accounting apparatuses 21 (Y1) to (Y3), the judgment by the depositing judgment unit 26A of the management unit 26 and the selection by the selection unit 26B of the management unit 26 are performed. As a result, as shown in FIG. 14, the cash accounting apparatus 21 (Y1) is selected as the one cash accounting apparatus 21 into which the cash to be collected received in the cash transport cassette 30 (Z2) is to be deposited (S226). Then, information related to the selection is transmitted to the display apparatus 195 of the cash settlement apparatus 11 (X2) (S228).

Thereafter, the money amount of the cash accounting apparatus 21 (Y1), which is selected for the cash settlement apparatus 11 (X2), is provisionally updated (S230). Namely, the money amount of the cash accounting apparatus 21 (Y1) is updated to two hundred ninety which is a value obtained by adding the amount of cash to be collected from the cash settlement apparatus 11 (X2), i.e., forty, to the current money amount of two hundred fifty. In FIG. 14, the row entitled "Money Amount upon Judgment" of the rows of "X3" shows the provisionally updated money amounts of the respective cash accounting apparatus 21 (Y1) to (Y3).

Then, when a third clerk selects start of the collecting process in the cash settlement apparatus 11 (X3), the cash settlement apparatus 11 (X3) feeds out all the one hundred twenty cash stored in the storing unit 150, and dispenses the cash to the cash transport cassette 30 (Z3) (S200). After that, based on the provisionally updated money amounts of the respective cash accounting apparatuses 21 (Y1) to (Y3), the judgment by the depositing judgment unit 26A of the management unit 26 and the selection by the selection unit 26B of the management unit 26 are performed. As a result, as shown in FIG. 14, the cash accounting apparatus 21 (Y3) is selected as the one cash accounting apparatus 21 into which the cash to be collected received in the cash transport cassette 30 (Z3) is to be deposited (S226). Then, information related to the selection is transmitted to the display apparatus 195 of the cash settlement apparatus 11 (X3) (S228).

The display apparatuses 195 of the respective cash settlement apparatuses 11 (X1) to 11 (X3) display the selection results transmitted from the management unit 26 (S232). Thus, the first to third clerks can obtain information related to the cash accounting apparatuses 21 into which the cash to be collected received in the respective cash transport cassettes 30 (Z1) to 30 (Z3) is to be deposited.

Following thereto, the respective clerks detach the respective cash transport cassettes 30 (Z1) to 30 (Z3) from the cash settlement apparatuses 11 (X1) to 11 (X3), respectively (S240). Then, the respective clerks transport the cash transport cassettes 30 (Z1) to 30 (Z3) to the cash accounting apparatuses 21 shown by the display apparatuses 195. Since a depositing operation performed in each cash accounting apparatus 21 and a succeeding operation performed by the cash management apparatus 25 are the same as those from the step S245 to S285 in the second embodiment shown in FIG. 12, detailed description is omitted.

As described above, according to the cash handling system 1 in this embodiment, before cash to be collected is actually deposited from the one cash settlement apparatus 11 into the cash accounting apparatus 21, an operation of the management unit 26 for the other cash settlement apparatuses 11 can be performed, taking provisional money amounts of the respective cash accounting apparatuses 21 into account. Thus, according to this embodiment, sales proceeds in the plurality of cash settlement apparatuses 11 can be simultaneously collected. In addition, each clerk can transport cash to be collected from the cash settlement apparatus 11 to the optimum cash accounting apparatus 21 without any hesitation. Thus, a time period required for collecting sales proceeds can be furthermore reduced.

Modification of First to Third Operational Embodiments

In the aforementioned first to third operational embodiments, there have been described the examples in which all the cash stored in the respective cash settlement apparatuses 11, but the present invention is not limited thereto. For example, a preset loading amount, which is an amount of cash to be loaded into the cash settlement apparatus 11, may be set in advance for each cash settlement apparatus 11. In this case, the cash transport cassette 30 corresponding to each cash settlement apparatus 11 receives cash in the cash settlement apparatus 11 such that cash of the preset loading amount remains in the cash settlement apparatus 11, and transfers the received cash to the proper cash accounting apparatus 21.

For example, the cash transport cassette 30 may collect cash stored in the cash settlement apparatus 11 such that a certain amount of cash required as change funds, which should be loaded into the cash settlement apparatus 11 before opening of a store, remain in the cash settlement apparatus 11. Namely, only the excessive cash whose amount is calculated by reducing the amount required as change funds (e.g., one hundred fifty cash) from the amount of cash stored in the cash settlement apparatus 11 may be collected by the cash transport cassette 30.

Also when only excessive cash is collected, the cash management system 1 according to this embodiment can develop an effect. An operation of the cash management system 1 only differs in that the "Collection Amount" shown in FIG. 11, 13 or 14 does not mean the all amount of cash stored in each cash settlement apparatus 11 but means the excessive amount of cash, and the other operations are the same. Thus, detailed description of the operation of the modification is omitted.

Fourth Operational Embodiment

Next, there is described an another embodiment of operation in which a clerk collects sales proceeds stored in the cash settlement apparatus 11 (X1) of the respective cash settlement apparatuses 11 into the cash accounting apparatus 21.

In this embodiment, similarly to the aforementioned modification of the first to third operational embodiments, a preset loading amount, which is an amount of cash to be loaded in the cash settlement apparatus 11, is set in advance. In addition, in this embodiment, the dispensing judgment unit 26C of the management unit 26 is configured to, when the cash transport cassette 30 is attached to the cash settlement apparatus 11, judge whether cash of an amount satisfying the preset loading amount of the cash settlement apparatus 11 can be dispensed from the cash accounting apparatus 21 or not. In the below described embodiment, the same units as those of the above first embodiment are shown by the same reference numbers and detailed description thereof is omitted.

In this embodiment, it is supposed that ninety cash are stored in the cash settlement apparatus 11 (X1), and that all the ninety cash are collected by the cash transport cassette 30 (Z1). In addition, it is supposed that the three cash accounting apparatuses 21 (Y1) to 21 (Y3) have already stored one hundred fifty cash, two hundred cash and forty cash, respectively. On the other hand, in this embodiment, it is supposed that, after the ninety cash stored in the cash settlement apparatus 11 (X1) have been collected, it is necessary that one hundred fifty cash as change funds are loaded in the cash settlement apparatus 11 (X1) before opening of a store on a next day of the collection, for example.

(Collecting Process)

Figure 15:
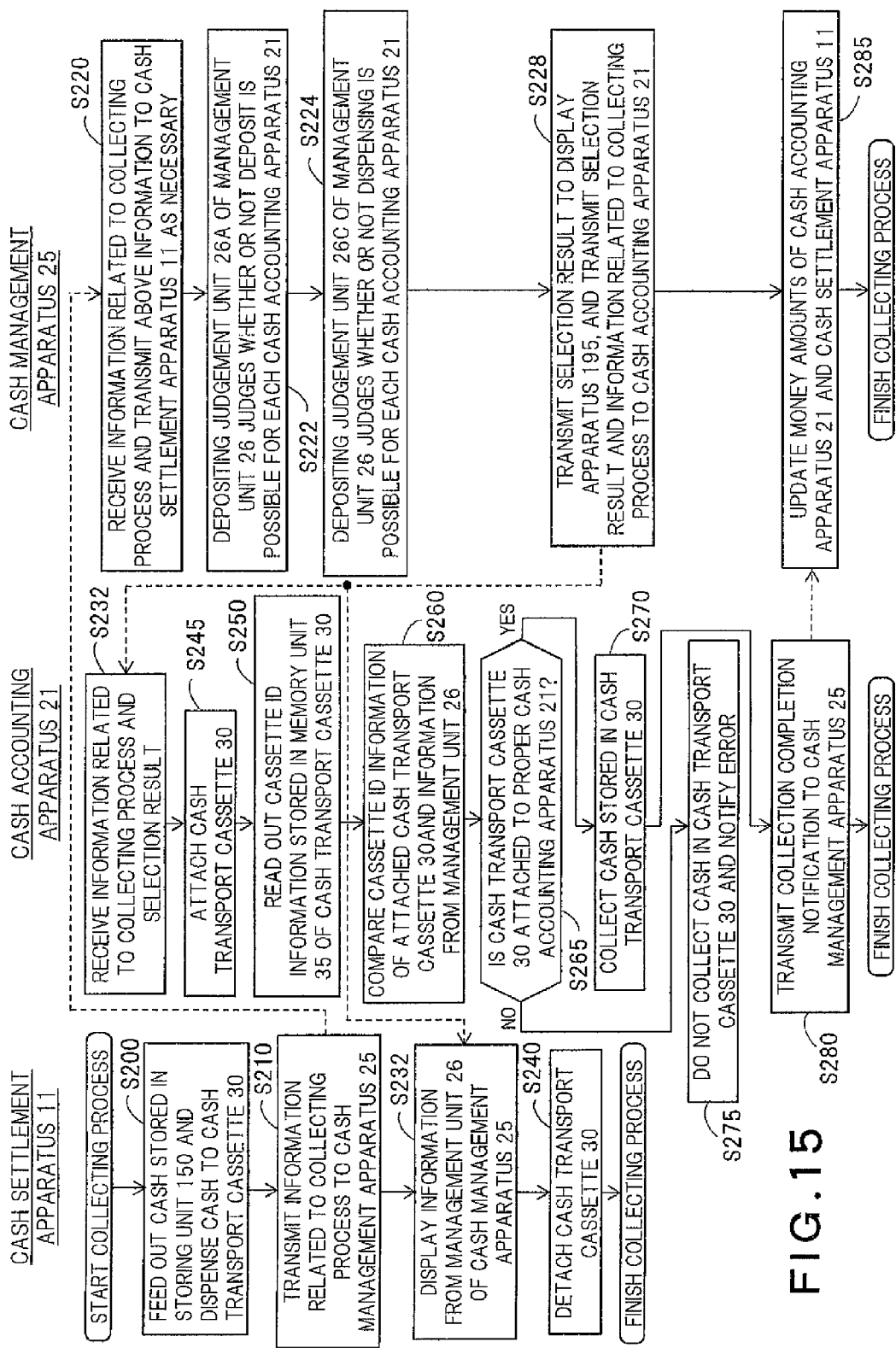
FIG. 15 is a flowchart showing the collecting operation in a fourth operational embodiment.

A collecting process in this embodiment is described herebelow with reference to FIGS. 15 and 16. FIG. 15 is a flowchart showing an operation of the collecting process in the cash management system 1 according to this embodiment.

In the first place, when a clerk selects start of the collecting process in the cash settlement apparatus 11 (X1), the cash accounting apparatus 21 or the cash management apparatus 25, the cash settlement apparatus 11 (X1) feeds out all the ninety cash stored in the storing unit 150 and dispenses the cash to the cash transport cassette 30 (Z1) (S200).

The cash settlement apparatus 11 (X1) relates its own ID information, cassette ID information (=Z1) storing the cash to be collected, denomination information of the cash to be collected, and amount information thereof, and transmits the information to the cash accounting apparatus 21 of the back office 20 (S210). The cash management apparatus 25 installed in the back office 20 receives the information related to collecting process from the cash settlement apparatus 11 (X11) and stores the information related to collecting process (S220).

Based on the information related to collecting process from the cash settlement apparatus 11 (X1), the depositing judgment unit 26A of the management unit 26 of the cash management apparatus 25 judges whether the cash to be collected received in the cash transport cassette 30 (Z1) can be deposited into the respective cash accounting apparatuses 21 (Y1) to 21 (Y3) (S222).

To be specific, the depositing judgment unit 26A firstly adds the amount of cash having been already stored in the cash accounting apparatus 21 (Y1), i.e., one hundred fifty, and the amount of cash to be collected received in the cash transport cassette 30 (Z1), i.e., ninety. Then, the depositing judgment unit 26A judges whether the calculated addition result exceeds the storable amount of the cash accounting apparatus 21. In this case, the addition result is two hundred forty, which falls below the storable amount of three hundred of the cash accounting apparatus 21 (Y1). Thus, a depositing judgment result for the cash accounting apparatus 21 (Y1) is "OK".

In the similar manner, the depositing judgment unit 26A performs the depositing judgment for the cash accounting apparatus 21 (Y2) and the cash accounting apparatus 21 (Y3). FIG. 16 shows the results of depositing judgment performed in this manner. These judgment results are related to the cassette ID information of the cash transport cassette 30 (Z1), and are then stored in the management unit 26.

Then, based on the information related to collecting process from the cash settlement apparatus 11 (X1), the dispensing judgment unit 26C of the management unit 26 of the cash management apparatus 25 judges whether cash of an amount required as change funds of the cash settlement apparatus 11 (X1) can be dispensed from the respective cash accounting apparatuses 21 after the collecting process (S224). It is sufficient for the dispensing judgment unit 26C to perform a judgment regarding possibility of dispensing only for the cash accounting apparatus 21 judged as "OK" by the depositing judgment unit 26A among the respective cash accounting apparatuses 21 (Y1) to (Y3).

To be specific, the dispensing judgment unit 26C firstly adds the amount of cash having been already stored in the cash accounting apparatus 21 (Y1), i.e., one hundred fifty, and the cash to be collected received in the cash transport cassette 30 (Z1), i.e., ninety. Then, the dispensing judgment unit 26C judges whether the calculated addition result exceeds an amount (one hundred fifty) required as change funds of the cash settlement apparatus 11 (X1) or not. In this case, the addition result is two hundred forty, which exceed the amount required as change funds of the cash settlement apparatus 11 (X1). Thus, a dispensing judgment result for the cash accounting apparatus 21 (Y1) is "NG".

In the similar manner, the dispensing judgment unit 26C performs the dispensing judgment for the cash accounting apparatus 21 (Y2) and the cash accounting apparatus 21 (Y3). FIG. 16 shows the results of dispensing judgment performed in this manner. In FIG. 16, the row entitled "Money Amount upon Judgment" shows the amounts of cash having been already stored in the respective cash accounting apparatuses 21 (Y1) to 21 (Y3) when the depositing judgment unit 26A and the dispensing judgment unit 26C perform the judgment.

Then, the information related to the results of judgment performed by the depositing judgment unit 26A of the management unit 26 and the dispensing judgment unit 26C thereof is transmitted to the display apparatus 195 (S228). As shown in FIG. 15, the information may be transmitted to the respective cash accounting apparatuses 21. At this time, the information related to collecting process may be simultaneously transmitted to the respective cash accounting apparatuses 21.

The display apparatus 195 displays the judgment results transmitted from the management unit 26 (S232). For example, the judgment result of "OK" or "NG" as to the depositing and dispensing of cash in the respective cash accounting apparatuses 21 (Y1) to 21 (Y3) is displayed. Thus, the clerk can obtain information related to the cash accounting apparatus 21 into which the cash to be collected received in the cash transport cassette 30 (Z1) can be deposited, the cash accounting apparatus 21 also capable of dispensing cash of an amount required as change funds of the cash settlement apparatus 11 (X1).

Then, the clerk detaches the cash transport cassette 30 (Z1) from the cash settlement apparatus 11 (X1) (S240). Thereafter, the clerk transports the cash transport cassette 30 (Z1) to the cash accounting apparatus 21. As described above, the clerk has obtained the information related to the cash accounting apparatus 21 into which the cash to be collected received in the cash transport cassette 30 (Z1) can be deposited, the cash accounting apparatus 21 also capable of dispensing cash of an amount required as change funds of the cash settlement apparatus 11 (X1). Thus, the clerk can transport the cash transport cassette 30 (Z1) to any one of the cash accounting apparatuses 21 (Y1) and 21 (Y2) without any hesitation.

An operation for depositing cash into the cash accounting apparatus 21 and a succeeding operation by the cash management apparatus 25 are the same as those from the step S245 to the step S285 in the first embodiment shown in FIG. 10, detailed description thereof is omitted.

(Loading Process)

Next, there is described an operation for loading change funds to the cash settlement apparatus 11 (X1) before opening of a store. In this embodiment, there is described an example in which a clerk transports change funds from any one of the cash accounting apparatuses 21 (Y1) and 21 (Y2) to the cash settlement apparatus 11 (X1) with the use of the cash transport cassette 30 (Z1).

In the first place, a clerk selects start of the loading process in the cash accounting apparatus 21 or the cash management apparatus 25, and attaches the cash transport cassette 30 (Z1) void of cash to the cash accounting apparatus 21. When the cash transport cassette 30 is attached, the reading unit 257 of the cash accounting apparatus 21 reads out the information (cassette ID) stored in the memory unit 35 of the cash transport cassette 30 (Z1). The read-out cassette ID information, together with the ID information of the cash accounting apparatus 21 to which the cash transport cassette 30 (Z1) is attached, is transmitted to the cash management apparatus 25.

The cash management apparatus 25 compares the results of judgment performed upon collecting process by the depositing judgment unit 26A of the management unit 26 and the dispensing judgment unit 26C thereof, and the cassette ID information read out by the cash accounting apparatus 21. To be specific, the cash management apparatus 25 performs the comparison process to confirm whether the ID information of the cash accounting apparatus 21 to which the cash transport cassette 30 (Z1) is attached corresponds to the cash accounting apparatus 21 that is judged as "OK" in the results of judgment upon collecting process by the depositing judgment unit 26A and the dispensing judgment unit 26C. Thus, it can be judged whether the cash transport cassette 30 (Z1) is properly attached to any one of the cash accounting apparatuses 21 (Y1) and 21 (Y2) that is judged as "OK" in the judgment result.

Upon receipt of the notification that the cash transport cassette 30 has been transported, the cash management apparatus 25 transmits, to the cash accounting apparatus 21, ID information (=X1) of the cash settlement apparatus 11 that requires loading of cash, denomination information of cash to be loaded, and amount information (=one hundred fifty) thereof. Then, the cash accounting apparatus 21 dispenses cash to be loaded into the cash settlement apparatus 11 (X1) into which change funds should be loaded, from the storing unit 250 to the cash transport cassette 30 (Z1).

Then, the cash accounting apparatus 21 displays, on the operation display unit 295, the ID information of the cash settlement apparatus 11 (X1) into which change funds should be loaded. Thus, a clerk can specify the cash settlement apparatus 11 into which change funds should be loaded. Then, the clerk detaches the cash transport cassette 30 (Z1) from the cash accounting apparatus 21. After that, the clerk transports the cash transport cassette 30 to the cash settlement apparatus 11 (X1) for loading change funds thereinto.

When the clerk attaches the cash transport cassette 30 (Z1) to the cash settlement apparatus 11, the reading unit 157 of the cash settlement apparatus 11 reads out the information (cassette ID information) stored in the memory unit 35 of the cash transport cassette 30 (Z1). The read-out cassette ID information, together with the ID information of the cash settlement apparatus 11 to which the cash transport cassette 30 (Z1) is attached, is transmitted to the cash management apparatus 25.

The cash management apparatus 25 compares the ID information of the cash settlement apparatus 11 to which the cash transport cassette 30 (Z1) is attached, and the cassette ID information read out by the cash settlement apparatus 11. Thus, it can be judged whether the cash transport cassette 30 (Z1) is properly attached to the cash settlement apparatus 11 (X1) or not.

When it is judged that the cash transport cassette 30 (Z1) is properly attached to the cash settlement apparatus 11 (X1), the cash settlement apparatus 11 (X1) deposits the cash from the cash transport cassette 30 (Z1) and stores the cash into the storing unit 150. Thus, change of a required amount is prepared in the cash settlement apparatus 11 (X1).

As described above, the management unit 26 of the cash handling system 1 according to this embodiment further includes the dispensing judgment unit 26C configured to, when the cash transport cassette 30 is attached to the cash settlement apparatus 11, judge whether cash of an amount satisfying a preset loading amount of the cash settlement apparatus 11 can be dispensed from the cash accounting apparatus 21 or not. Thus, a clerk can obtain information related to the cash accounting apparatus 21 into which cash to be collected received in the cash transport cassette 30 can be deposited from the specific cash settlement apparatus 11, the cash accounting apparatus 21 also capable of dispensing cash of an amount required as change funds of this cash settlement apparatus 11. Therefore, the clerk can transport cash to be collected from the specific cash settlement apparatus 11 to the proper cash accounting apparatus 21 without any hesitation. As a result, a time period required for collecting sales proceeds can be reduced, as well as change funds of the cash settlement apparatus 11 can be reliably prepared.

Fifth Operational Embodiment

Next, there is described another embodiment of an operation in which a clerk collects sales proceeds stored in the cash settlement apparatus 11 (X1) of the respective cash settlement apparatuses 11 to the cash accounting apparatus 21.

In this embodiment, the selection unit 26B of the management unit 26 is configured to, when the cash transport cassette 30 is attached to the cash settlement apparatus 11, select one of the cash accounting apparatuses 21 into which cash in the cash settlement apparatus 11 to be received by the cash transport cassette 30 is to be deposited, based on information from the depositing judgment unit 26A and the dispensing judgment unit 26C. In this embodiment, the other structures are substantially the same as those of the aforementioned fourth embodiment. Thus, in the below described embodiment, the same units as those of the above fourth embodiment are shown by the same reference numbers and detailed description thereof is omitted.

Also in this embodiment, similarly to the above fourth embodiment, it is supposed that ninety cash are stored in the cash settlement apparatus 11 (X1), and all the ninety cash are collected by the cash transport cassette 30 (Z1). In addition, it is supposed that the three cash accounting apparatuses 21 (Y1) to 21 (Y3) have already stored one hundred fifty cash, two hundred cash and forty cash, respectively. In addition, it is supposed that, after the ninety cash stored in the cash settlement apparatus 11 (X1) have been collected, it is necessary that one hundred fifty cash as change funds are loaded in the cash settlement apparatus 11 (X1) before opening of a store on a next day of the collection, for example.

(Collecting Process)

Figure 17:
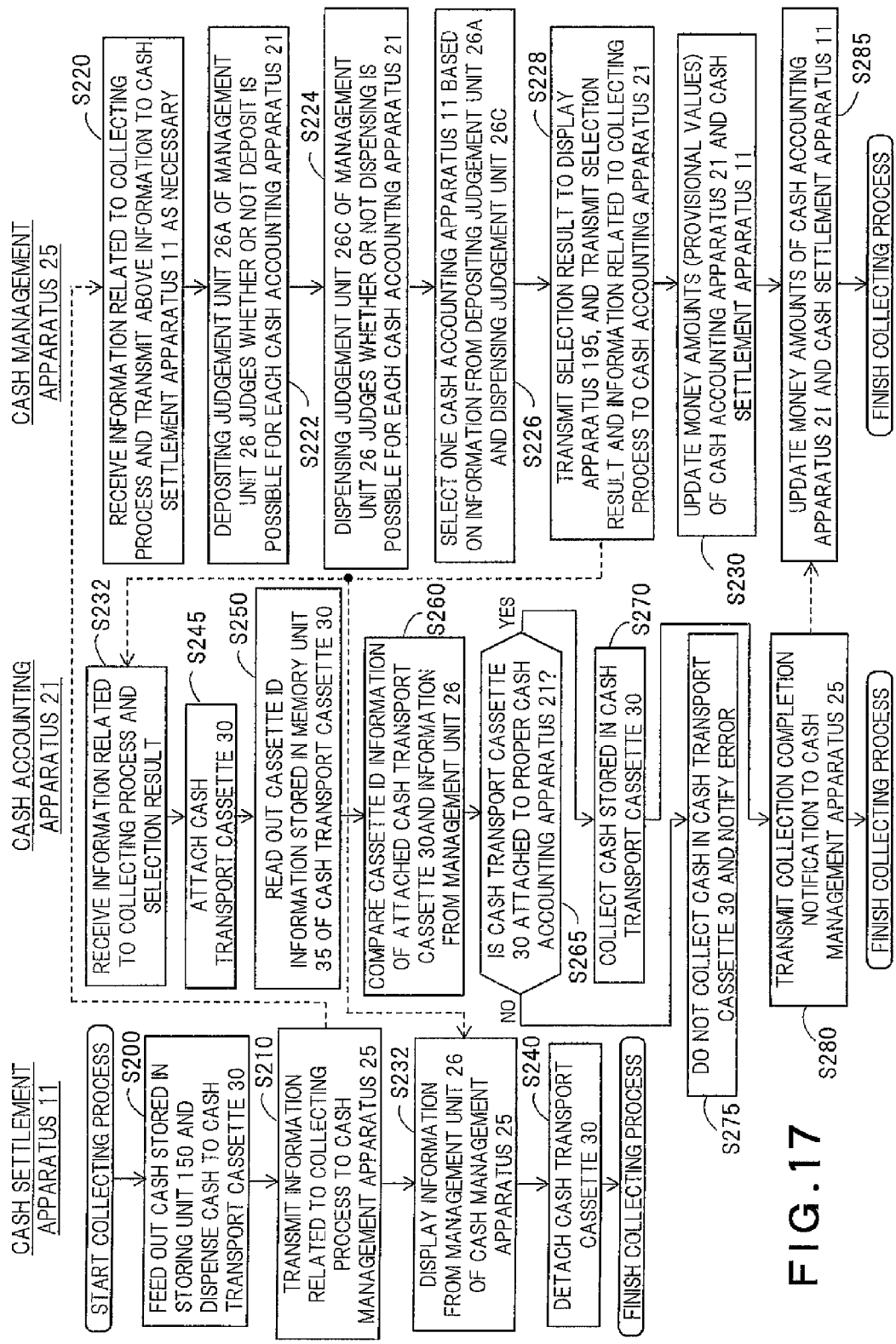
FIG. 17 is a flowchart showing the collecting operation in a fifth operational embodiment.

A collecting process in this embodiment is described hereebelow with reference to FIGS. 17 and 18. FIG. 17 is a flowchart showing an operation of the collecting process in the cash management system 1 according to this embodiment.

In the first place, when a clerk selects start of the collecting process in the cash settlement apparatus 11 (X1), the cash accounting apparatus 21 or the cash management apparatus 25, the cash settlement apparatus 11 (X1) feeds out all the ninety cash stored in the storing unit 150 and dispenses the cash to the cash transport cassette 30 (Z1). Since an operation from the step S200 to the step S222 shown in FIG. 17 is the same as the operation from the step S200 to the step S224 of the fourth embodiment shown in FIG. 15, detailed description thereof is omitted.

FIG. 18 shows results of judgment performed by the depositing judgment unit 26A of the management unit 26 and the dispensing judgment unit 26C thereof. These judgment results are related to the cassette ID information of the cash transport cassette 30 (Z1), and are then stored in the management unit 26. In this embodiment, there may be simultaneously calculated an imaginary money amount of the cash accounting apparatus 21, which is calculated on the assumption that cash to be collected is deposited from the cash settlement apparatus 11 (Z1) into the cash accounting apparatus 21 that was judged as "OK" upon judgment by the depositing judgment unit 26A. In FIG. 18, the calculated imaginary money amounts are shown in parentheses.

Then, based on the information from the depositing judgment unit 26A and the dispensing judgment unit 26C, the selection unit 26B of the management unit 26 selects the cash accounting apparatus 21 into which the cash to be collected received in the cash transport cassette 30 (Z1) is to be deposited (S226). Various references can be considered as a selection reference at this time. For example, there can be considered a selection reference based on which the cash accounting apparatus 21 having the minimum difference between the imaginary money amount and the storable amount is selected among the cash accounting apparatuses 21 that are judged as "OK" by the depositing judgment unit 26A and the dispensing judgment unit 26C.

The imaginary money amount of the cash accounting apparatus 21 (Y1) is two hundred forty. Thus, a difference between the imaginary money amount and the storable amount is sixty. The imaginary money amount of the cash accounting apparatus 21 (Y2) is two hundred ninety. Thus, a difference between the imaginary money amount and the storable amount is ten. The imaginary money amount of the cash accounting apparatus 21 (Y3) is one hundred thirty. Thus, a difference between the imaginary money amount and the storable amount is one hundred seventy. Therefore, the selection unit 26B selects the cash accounting apparatus 21 (Y2) as the one cash accounting apparatus 21 into which the cash to be collected received in the cash transport cassette 30 (Z1) is to be deposited (see FIG. 18).

Then, the information related to the result of selection performed by the selection unit 26B of the management unit 26 is transmitted to the display apparatus 195 (S228). As shown in FIG. 17, the information may be transmitted to the respective cash accounting apparatuses 21. At this time, the information related to collecting process may be simultaneously transmitted to the respective cash accounting apparatuses 21.

In addition, after the cash accounting apparatus 21 (Y2) has been selected by the selection unit 26B, the cash management apparatus 25 may provisionally update the money amount of the selected cash accounting apparatus 21 (Y2) (S230). Namely, the money amount of the cash accounting apparatus 21 (Y2) may be updated to two hundred ninety which is a value obtained by adding the amount of the cash to be collected from the cash settlement apparatus 11 (X1), i.e., ninety, to the current money amount of two hundred. Thus, when the depositing judgment unit 26A and the dispensing judgment unit 26C perform judgment as to whether deposit is possible or impossible for the other cash settlement apparatuses 11 before the cash to be collected is actually deposited from the cash settlement apparatus 30 (X1) into the cash accounting apparatus 21 (Y2), the depositing judgment unit 26A and the dispensing judgment unit 26C can perform proper judgment.

The display apparatus 195 displays the selection result transmitted from the management unit 26 (S232). For example, there is displayed the selection result in which the cash to be collected stored in the cash transport cassette 30 (Z1) is transported to the cash accounting apparatus 21 (Y2). Thus, the clerk can obtain information related to the cash accounting apparatus 21 into which the cash to be collected received in the cash transport cassette 30 (Z1) is to be deposited.

Then, the clerk detaches the cash transport cassette 30 from the cash settlement apparatus 11 (X1) (S240). Thereafter, the clerk transports the cash transport cassette 30 (Z1) to the cash accounting apparatus 21 (Y2). Since an operation for depositing cash into each cash accounting apparatus 21 and a succeeding operation by the cash management apparatus 25 are the same as those from the step S245 to the step S285 in the second embodiment shown in FIG. 12, detailed description thereof is omitted.

(Loading Process)

After the above collecting process and before opening of a store, a clerk transports change funds from the cash accounting apparatus 21 (Y2) to the cash settlement apparatus 11 (X1) with the use of the cash transport cassette 30 (Z1). Since a concrete operation in the loading process is substantially the same as the operation in the loading process in the aforementioned fourth embodiment, detailed description thereof is omitted.

As described above, the management unit 26 of the cash handling system 1 according to this embodiment further includes the selection unit 26B configured to, when the cash transport cassette 30 is attached to the cash settlement apparatus 11, select one of the cash accounting apparatuses 21 into which cash in the cash settlement apparatus 11 to be received by the cash transport cassette 30 is to be deposited, based on information from the depositing judgment unit 26A and the dispensing judgment unit 26C. Thus, a clerk can transport cash to be collected from the specific cash settlement apparatus 11 to the optimum cash accounting apparatus 21 without any hesitation. Thus, a time period required for collecting sales proceeds can be further reduced.

In this embodiment, there has been described the example in which the selection unit 26B selects the cash accounting apparatus 21 which has the minimum difference between the imaginary money amount and the storable amount. However, a concrete selection reference of the selection unit 26B is not particularly limited. For example, the selection unit 26B may select the cash accounting apparatus 21 which has the maximum difference between the imaginary money amount and the storable amount. Alternatively, the selection unit 26B may select the cash accounting apparatus 21 which has a difference between the imaginary money amount and the storable amount that is closest to a preset value.

Sixth Operational Embodiment

Next, there is described an example in which a clerk collects sales proceeds stored in the cash settlement apparatuses 11 (X1) to 11 (X3) of the respective cash settlement apparatuses 11 into the cash accounting apparatus 21.

In this embodiment, there is described a case in which, after the operation of the management unit 26 has been performed for the cash settlement apparatus (X1), an operation of the management unit 26 is performed for the cash settlement apparatus 11 (X2) and the cash settlement apparatus 11 (X3), before cash to be collected is actually deposited from the cash settlement apparatus 11 (X1) into the cash accounting apparatus 21. In the below described embodiment, the same units as those of the above fourth embodiment and the fifth embodiment are shown by the same reference numbers and detailed description thereof is omitted.

It is supposed that the cash settlement apparatuses 11 (X1) to (X3) store ninety cash, forty cash and one hundred twenty cash, respectively, and that all the stored cash are collected by the corresponding cash transport cassettes 30 (Z1) to (Z3). In addition, it is supposed that the three cash accounting apparatuses 21 (Y1) to 21 (Y3) have already stored two hundred fifty cash, two hundred cash and forty cash, respectively. In addition, it is supposed that, after all the cash stored in the respective cash settlement apparatuses 11 (X1) to (X3) have been collected, it is necessary that one hundred fifty cash as change funds are loaded in the respective cash settlement apparatuses 11 (X1) to (X3) before opening of a store on a next day of the collection, for example.

(Collecting Process)

A collecting process in this embodiment is described herebelow with reference to FIG. 19. Since an operation of the cash management apparatus 25 for each of the cash settlement apparatuses 11 is substantially the same as that of the fifth embodiment shown in FIG. 17, the flowchart showing in FIG. 17 is suitably referred to also in this embodiment.

In the first place, when a first clerk selects start of the collecting process in the cash settlement apparatus 11 (X1), the cash settlement apparatus 11 (X1) feeds out all the ninety cash stored in the storing unit 150, and dispenses the cash to the cash transport cassette 30 (Z1) (S200). Thereafter, similarly to the aforementioned fifth embodiment, the cash accounting apparatus 21 (Y2) is selected as the one cash accounting apparatus 21 into which the cash to be collected received in the cash transport cassette 30 (Z1) is to be deposited (S226). Then, information related to the selection result is displayed on the display apparatus 195 of the cash settlement apparatus 11 (X1) (S228).

FIG. 19 shows results of judgment performed by the depositing judgment unit 26A and the dispensing judgment unit 26C in this embodiment and results of selection performed by the selection unit 26B in this embodiment. The judgment results and the selection results are related to the cassette ID information of the cash transport cassette 30 (Z1), and are then stored in the management unit 26. As shown in FIG. 19, the row entitled "X1" shows the same results as those of the fifth embodiment shown in FIG. 18.

Thereafter, the money amount of the cash accounting apparatus 21 (Y2), which is selected for the cash settlement apparatus 11 (X1), is provisionally updated (S230). Namely, the money amount of the cash accounting apparatus 21 (Y2) is updated to two hundred ninety which is a value obtained by adding the amount of cash to be collected from the cash settlement apparatus 11 (X1), i.e., ninety, to the current money amount of two hundred. In FIG. 19, the row entitled "Money Amount upon Judgment" of the rows of "X2" shows the provisionally updated money amounts of the respective cash accounting apparatus 21 (Y1) to (Y3).

Then, when a second clerk selects start of the collecting process in the cash settlement apparatus 11 (X2), the cash settlement apparatus 11 (X2) feeds out all the forty cash stored in the storing unit 150, and dispenses the cash to the cash transport cassette 30 (Z2) (S200). After that, based on the provisionally updated money amounts of the respective cash accounting apparatuses 21 (Y1) to (Y3), the judgment by the depositing judgment unit 26A of the management unit 26 and the dispensing judgment unit 26C thereof, and the selection by the selection unit 26B of the management unit 26 are performed. As a result, as shown in FIG. 19, the cash accounting apparatus 21 (Y1) is selected as the one cash accounting apparatus 21 into which the cash to be collected received in the cash transport cassette (Z2) is to be deposited (S226). Then, information related to the selection is transmitted to the display apparatus 195 of the cash settlement apparatus 11 (X2) (S228).

Thereafter, the money amount of the cash accounting apparatus 21 (Y1), which is selected for the cash settlement apparatus 11 (X2), is provisionally updated (S230). Namely, the money amount of the cash accounting apparatus 21 (Y1) is updated to one hundred ninety which is a value obtained by adding the amount of cash to be collected from the cash settlement apparatus 11 (X2), i.e., forty, to the current money amount of one hundred fifty. In FIG. 19, the row entitled "Money Amount upon Judgment" of the rows of "X3" shows the provisionally updated money amounts of the respective cash accounting apparatus 21 (Y1) to (Y3).

Then, when a third clerk selects start of the collecting process in the cash settlement apparatus 11 (X3), the cash settlement apparatus 11 (X3) feeds out all the one hundred twenty cash stored in the storing unit 150, and dispenses the cash to the cash transport cassette 30 (Z3) (S200). After that, based on the provisionally updated money amounts of the respective cash accounting apparatuses 21 (Y1) to (Y3), the judgment by the depositing judgment unit 26A of the management unit 26 and the dispensing judgment unit 26C thereof, and the selection by the selection unit 26B of the management unit 26 are performed. As a result, as shown in FIG. 19, the cash accounting apparatus 21 (Y3) is selected as the one cash accounting apparatus 21 into which the cash to be collected received in the cash transport cassette 30 (Z3) is to be deposited (S226). Then, information related to the selection is transmitted to the display apparatus 195 of the cash settlement apparatus 11 (X3) (S228).

The display apparatuses 195 of the respective cash settlement apparatuses 11 (X1) to 11 (X3) display the selection results transmitted from the management unit 26 (S232). Thus, the first to third clerks can obtain information related to the cash accounting apparatuses 21 into which the cash to be collected received in the respective cash transport cassettes 30 (Z1) to 30 (Z3) is to be deposited.

Following thereto, the respective clerks detach the respective cash transport cassettes 30 (Z1) to 30 (Z3) from the cash settlement apparatuses 11 (X1) to 11 (X3), respectively (S240). Then, the respective clerks transport the cash transport cassettes 30 (Z1) to 30 (Z3) to the cash accounting apparatuses 21 shown by the display apparatuses 195. Since a depositing operation performed in each cash accounting apparatus 21 and a succeeding operation performed by the cash management apparatus 25 are the same as those from the step S245 to S285 in the second embodiment shown in FIG. 12, detailed description is omitted.

(Loading Process)

After the above collecting process and before opening of a store, change funds are transported from the cash accounting apparatus 21 (Y2) to the cash settlement apparatus 11 (X1) with the sue of the cash transport cassette 30 (Z1). In addition, change funds are transported from the cash accounting apparatus 21 (Y1) to the cash settlement apparatus 11 (X2) with the use of the cash transport cassette 30 (Z2). In addition, change funds are transported from the cash accounting apparatus 21 (Y3) to the cash settlement apparatus 11 (X3) with the use of the cash transport cassette 30 (Z3). Since a concrete operation in the loading process is substantially the same as the operation in the loading process in the aforementioned fourth embodiment, detailed description thereof is omitted.

As described above, according to the cash handling system 1 in this embodiment, before cash to be collected is actually deposited from the one cash settlement apparatus 11 into the cash accounting apparatus 21, an operation of the management unit 26 for the other cash settlement apparatuses 11 can be performed, taking provisional money amounts of the respective cash accounting apparatuses 12 into account. Thus, according to this embodiment, sales proceeds in the plurality of cash settlement apparatuses 11 can be simultaneously collected. In addition, each clerk can transport cash to be collected from the cash settlement apparatus 11 to the optimum cash accounting apparatus 21 without any hesitation. Thus, a time period required for collecting sales proceeds can be furthermore reduced.

In the aforementioned fourth to sixth embodiments, there has been described the example in which change funds are loaded into the cash settlement apparatuses 11 on the next day of the collection. However, the present invention is not limited thereto, and change funds may be loaded into the cash settlement apparatuses 11 immediately after the collection.

Modification

In the above respective operational embodiments, there has been described the example in which the cash transport cassette 30 having the cassette ID information of Zk (k=integer of 1 to 30) is related to the cash settlement apparatus 11 (Xk). Namely, the cash transport cassette 30 having the cassette ID information of Zk (k=integer of 1 to 30) is exclusively used with the cash settlement apparatus 11 (Xk). However, the present invention is not limited thereto, and the cash transport cassette 30 may not be related to the specific cash settlement apparatus 11. Namely, the cash transport cassette 30 may be usable with any of the respective cash settlement apparatuses 11. Such a modification is described.

A case in which a collecting process is performed is firstly described. Initially, the cash transport cassette 30 (hereinafter referred to as "cash transport cassette 30 (F)"), which is not related to any of the cash settlement apparatuses 11, is attached to the specific cash settlement apparatus 11, e.g., the cash settlement apparatus 11 (X4). The cash settlement apparatus 11 (X4) transmits, to the cash management apparatus 25, information indicating that the cash transport cassette 30 has been attached to the cash settlement apparatus (X4), together with its own ID Information (=X4), denomination information of cash to be collected and amount information thereof. The writing unit 158 of the cash settlement apparatus 11 (X4) writes, to the memory unit 35 of the cash transport cassette 30 (F), the information indicating that the cash transport cassette 30 (F) has been attached to the cash settlement apparatus 11 (X4).

Similarly to the above respective operational embodiments, the cash management apparatus 25 transmits to the display apparatus 195 information related to the suitable or optimum cash accounting apparatus 21 into which the cash to be collected from the cash settlement apparatus 11 (X4) is deposited. Based on the display of the display apparatus 195, a clerk transports the cash to be collected from the cash settlement apparatus 11 (X4) to the specific cash accounting apparatus 21, e.g., the cash accounting apparatus 21 (Y2), with the use of the cash transport cassette 30 (F).

The clerk attaches the cash transport cassette 30 (F) to the cash accounting apparatus 21 (Y2). The reading unit 257 of the cash accounting apparatus 21 (Y2) reads out, from the memory unit 35 of the cash transport cassette 30 (F), the information indicating that the cash transport cassette 30 (F) was attached to the cash accounting apparatus 11 (X4). In addition, the cash accounting apparatus 21 (Y2) transmits to the cash management apparatus 25 the information from the memory unit 35 of the cash transport cassette 30 (F) together with its own ID information (=Y2).

The comparison unit 27 of the cash management apparatus 25 compares the result of judgment or selection performed by the cash management apparatus 25 for the cash settlement apparatus 11 (X4), and the information transmitted from the cash accounting apparatus 21 (Y2). To be specific, the comparison unit 27 performs the comparison process to confirm whether the cash transport cassette 30 attached to the cash accounting apparatus 21 (Y2) is the cash transport cassette 30 (F) that was attached to the cash settlement apparatus 11 (X4). Thus, it can be confirmed that the cash transport cassette 30 (F) has been transported to the proper cash accounting apparatus 21.

Next, a case in which a loading process is performed as in the above fourth to sixth embodiments is described. Initially, the cash transport cassette 30 (F), which is not related to any of the cash settlement apparatuses 11, is attached to the specific cash accounting apparatus 21, e.g., the cash accounting apparatus 21 (Y2). The cash accounting apparatus 21 (Y2) transmits, to the cash management apparatus 25, information indicating that the cash transport cassette 30 has been attached to the cash accounting apparatus 21 (Y2) together with its own ID information (=Y2).

The cash management apparatus 25 searches information showing for which one of the cash settlement apparatuses 11 the cash accounting apparatus 21 (Y2) was judged as "OK" in the dispensing judgment in the previous collecting process, or information showing for which one of the cash settlement apparatuses 11 the cash accounting apparatus 21 (Y2) was selected. Thus, it is found that the cash accounting apparatus 21 (Y2) was selected for the cash settlement apparatus 11 (X4) in the previous collecting process. Then, the cash management apparatus 25 transmits, to the cash accounting apparatus 21 (Y2), the ID information (=X4) of the cash settlement apparatus 11 that requires loading of cash, denomination information of cash to be loaded, and amount information (=one hundred fifty) thereof. Then, the cash accounting apparatus 21 dispenses cash to be loaded into the cash settlement apparatus 11 (X4) into which change funds should be loaded, from the storing unit 250 to the cash transport cassette 30 (F). In addition, the writing unit 258 of the cash accounting apparatus 21 (Y2) writes, to the memory unit 35 of the cash transport cassette 30 (F), the information indicating that the cash transport cassette 30 (F) has been attached to the cash accounting apparatus 21 (Y2).

Then, the cash accounting apparatus (Y2) displays, on the operation display unit 295, the ID information of the cash settlement apparatus 11 (X4) into which change funds should be loaded. Thus, a clerk can specify the cash settlement apparatus 11 into which change funds should be loaded. Then, the clerk detaches the cash transport cassette 30 (F) from the cash accounting apparatus 21 (Y2). After that, the clerk transports the cash transport cassette 30 (F) to the cash settlement apparatus 11 (X4) for loading change funds thereinto.

When the clerk attaches the cash transport cassette 30 (F) to the cash settlement apparatus 11, the reading unit 157 of the cash settlement apparatus 11 reads out the information stored in the memory unit 35 of the cash transport cassette 30 (F), i.e., the information indicating that the cash transport cassette 30 (F) was attached to the cash accounting apparatus (Y2). The read-out information, together with the ID information of the cash settlement apparatus 11 to which the cash transport cassette 30 (F) is attached, is transmitted to the cash management apparatus 25.

The cash management apparatus 25 compares the ID information of the cash settlement apparatus 11 to which the cash transport cassette 30 (F) is attached, and the information from the memory unit 35 of the cash transport cassette 30 (F) which has been read out by this cash settlement apparatus 11. Thus, it can be judged whether the cash transport cassette 30 (F) storing the cash dispensed from the cash accounting apparatus 21 (Y2) is properly attached to the cash settlement apparatus 11 (X4) or not.

When it is judged that the cash transport cassette 30 (F) is properly attached to the cash settlement apparatus 11 (X4), the cash settlement apparatus 11 (X4) deposits the cash thereinto from the cash transport cassette 30 (F) and stores the cash into the storing unit 150. Thus, change of a required amount is prepared in the cash accounting apparatus 11 (X4).

According to this modification, even when the cash transport cassette 30 is not related to the specific cash settlement apparatus 11, cash can be properly transported between the cash settlement apparatus 11 and the cash accounting apparatus 21 due to the effect produced by the management unit 26.

In addition, when the cash transport cassette 30 is not related to the specific cash accounting apparatus 11 as in this modification, the number of the cash settlement apparatuses 30 and the number of the cash transport cassettes 30 are not necessarily the same with each other. Thus, according to this modification, the number of the required cash transport cassettes 30 can be decreased, whereby a cost needed for transporting cash between the cash settlement apparatus 11 and the cash accounting apparatus 21 can be reduced.

Other Modifications

In the aforementioned respective operational embodiments, there has been described the example in which the management unit 26 performs, based only on an amount of one denomination, judgment or selection for the cash accounting apparatus 21 into which cash to be collected from the cash settlement apparatus 11 is deposited, for convenience of explanation. However, the present invention is not limited thereto, and the management unit 26 may perform the above judgment or selection in consideration of amounts of a plurality of denominations respectively.

In addition, in the aforementioned respective operational embodiments, there has been described the example in which the sales proceeds of the cash settlement apparatus 11 are collected all at once by the cash transport cassette 30. However, the present invention is not limited thereto, and the sales proceeds of the cash settlement apparatus 11 may be collected a plurality of times by the cash transport cassette 30. In this case, based on an amount of collected cash for each time, the above judgment or selection by the management unit 26 may be performed every time.

In addition, in the aforementioned respective operational embodiments, there has been described the example in which the above judgment or selection by the management unit 26 is performed based on an amount of cash that is received by the cash transport cassette 30 from the cash settlement apparatus 11 and an amount of cash that has been already stored in the cash accounting apparatus 21. However, the present invention is not limited thereto, and the management unit 26 may perform the above judgment or selection based on another condition. For example, the cash accounting apparatus 21 may be configured to, when an amount of cash stored in the cash accounting apparatus 21 falls below a preset value, transmit to the management unit 26 an alarm signal which demand depositing of cash thereinto. Taking the alarm signal into consideration, the management unit 26 may perform the above judgment or the selection. For example, the management unit 26 may perform the above judgment or selection such that cash to be collected from the cash settlement apparatus 11 is preferentially deposited into the cash accounting apparatus 21 that has transmitted the alarm signal.

In addition, in the aforementioned embodiments and the respective operations, there has been described the example in which the display apparatus 195 configured to display information from the management unit 26 is provided on the banknote accounting apparatus 22 of the cash accounting apparatus 21. However, as long as the display apparatus 195 is located on such a position that a clerk can confirm the information, a position where the display apparatus 195 is located is not particularly limited.

In addition, in the aforementioned embodiments and the respective operations, there has been described the example in which information from the management unit 26 is visually transmitted to a clerk. However, the present invention is not limited thereto, and information from the management unit 26 may be transmitted to a clerk in a different manner. For example, information from the management unit 26 may be transmitted to a clerk by sound. Namely, in the aforementioned embodiments and the respective operations, the guide apparatus for guiding information from the management unit 26 may be a voice guide apparatus that acoustically transmits information. Further, a position at which the guide apparatus such as the display apparatus 195 for guiding information from the management unit 26 is not particularly limited. As long as the guide apparatus can guide information from the management unit 26 to a clerk, the guide apparatus may be located on any positions.

In addition, in the aforementioned embodiments and the respective operations, there has been described the example in which the management unit 26 is incorporated in the cash management apparatus 25 that is disposed separately from the cash settlement apparatus 11 and the cash accounting apparatus 21. However, as long as the management unit 26 is communicably connected to the cash settlement apparatus 11 and the cash accounting apparatus 21, a concrete location of the management unit 26 is not particularly limited. For example, the management unit 26 may be incorporated in the housing of the cash settlement apparatus 11. Alternatively, the management unit 26 may be incorporated in the housing of the cash accounting apparatus 21.

In addition, in the aforementioned respective operational embodiments, there has been described the example in which the ID information of the cash settlement apparatus 11, the cassette ID information of the cash transport cassette 30 (Z1) storing cash to be collected, and the information related to collecting process such as denomination information of cash to be collected and amount information thereof, are read out by the reading unit 257 of the cash accounting apparatus 21 from the memory unit 35 of the cash transport cassette 30. However, the method by means of which the cash accounting apparatus 21 obtains the information related to collecting process is not limited thereto, and the management unit 26 may transmit the information related to collecting process to the cash accounting apparatus 21 so that the cash accounting apparatus 21 can obtain the information related to collecting process (see above S228, for example).

Operational Modification of Comparison Unit

In addition, in the aforementioned respective operational embodiments, there has been described the example in which the comparison unit 27 judges whether the cash transport cassette 30 is attached to the proper cash accounting apparatus 21 on the basis of the ID information of the cash accounting apparatus 21 to which the cash transport cassette 30 is attached. However, the present invention is not limited thereto, and the comparison unit 27 may judge whether the cash transport cassette 30 is attached to the proper cash accounting apparatus 21 on the basis of the cassette ID information of the cash transport cassette 30. In particular, when the comparison unit 27 is disposed on each cash accounting apparatus 21, it is preferable that the judgment by the comparison unit 27 is performed on the basis of the cassette ID information of the cash transport cassette 30.

For example, as a modification of the aforementioned first operational embodiment, there is described a case in which the comparison unit 27 is disposed on each cash accounting apparatus 21, and the comparison unit 27 performs the judgment on the basis of the cassette ID information of the cash transport cassette 30. In this case, the management unit 26 transmits, to the comparison unit 27 of the cash accounting apparatus 21 (Y2) which is judged by the depositing judgment unit 26A that cash from the cash transport cassette 30 (Z1) can be deposited thereinto, the cassette ID information of the cash transport cassette 30 (Z1). Thereafter, when the predetermined cash transport cassette 30 is attached to the cash accounting apparatus 21 (Y2), the comparison unit 27 compares the cassette ID information of the predetermined cash transport cassette 30 which has been read out by the reading unit 257 of the cash accounting apparatus 21 (Y2), and the cassette ID information of the cash transport cassette 30 (Z1) which has been transmitted from the management unit 26. Thus, it can be judged whether the predetermined cash transport cassette 30 attached to the cash accounting apparatus 21 (Y2) agrees with the result of judgment by the depositing judgment unit 26A.

In addition, as a modification of the aforementioned second operational embodiment, there is described a case in which the comparison unit 27 is disposed on each cash accounting apparatus 21, and the comparison unit 27 performs the judgment on the basis of the cassette ID information of the cash transport cassette 30. In this case, the management unit 26 transmits, to the comparison unit 27 of the cash accounting apparatus 21 (Y2) that is selected by the selection unit 26B, the cassette ID information of the cash transport cassette 30 (Z1). Thereafter, when the predetermined cash transport cassette 30 is attached to the cash accounting apparatus 21 (Y2), the comparison unit 27 compares the cassette ID information of the predetermined cash transport cassette 30 which has been read out by the reading unit 257 of the cash accounting apparatus 21 (Y2), and the cassette ID information of the cash transport cassette 30 (Z1) which has been transmitted from the management unit 26. Thus, it can be judged whether the predetermined cash transport cassette 30 attached to the cash accounting apparatus 21 (Y2) agrees with the result of selection by the selection unit 26B.

In the aforementioned third to sixth operational embodiments, similarly to the modification of the first operational embodiment and the modification of the second operational embodiment, the comparison unit 27 may judge whether the cash transport cassette 30 is attached to the proper cash accounting apparatus 21 on the basis of cassette ID information of the cash transport cassette 30.

DESCRIPTION OF REFERENCE NUMBERS

1 Cash management system
10 Checkout counter
20 Back office
11 Cash settlement apparatus
21 Cash accounting apparatus
25 Cash management apparatus
26 Management unit
26A Depositing judgment unit
26B Selection unit
26C Dispensing judgment unit
27 Comparison unit
28 POS management apparatus
30 Cash transport cassette
35 Memory unit
110 Depositing unit
120 Dispensing unit
130 Transport unit
140 Recognition unit
150 Storing unit
157 Reading unit
158 Writing unit
160 Cassette attaching unit
170 Memory
180 Communication unit
190 Control unit
210 Depositing unit
220 Dispensing unit
295 Operation display unit
230 Transport unit
240 Recognition unit
250 Storing unit
255 Collecting unit
257 Reading unit
258 Writing unit
222 Apparatus-external reject unit
224 Apparatus-internal reject unit
270 Memory
280 Communication unit
290 Control unit

What is claimed is:

1. A cash handling system comprising:
a cash settlement apparatus configured to perform a settlement process with respect to a customer, by depositing and dispensing cash;
a cash accounting apparatus configured to dispense cash to be loaded into the cash settlement apparatus, and configured to deposit cash having been collected from the cash settlement apparatus; and
a cash transport cassette attachable to and detachable from the cash settlement apparatus and the cash accounting apparatus, the cash transport cassette configured to receive cash from the cash settlement apparatus to transfer the cash to the cash accounting apparatus;
wherein:
the cash transport cassette is configured to receive cash from the cash accounting apparatus and is configured to transfer the cash to the cash settlement apparatus;
the cash transport cassette includes a memory unit configured to store at least cassette ID information for specifying the cash transport cassette;
each of the cash settlement apparatus and the cash accounting apparatus has a reading unit configured to read out the cassette ID information from the memory unit of the cash transport cassette;
there are further provided a management unit and a comparison unit;
the management unit is communicably connected to the cash settlement apparatus and the cash accounting apparatus, the management unit includes a depositing judgment unit configured to, when the cash transport cassette is attached to the cash settlement apparatus, judge whether cash in the cash settlement apparatus received by the cash transport cassette is depositable into the cash accounting apparatus or not, and the management unit is configured to transmit to the comparison unit the cassette ID information of the cash transport cassette that transports the cash having been judged by the depositing judgment unit to be depositable into the cash accounting apparatus; and
the comparison unit is configured to, when the cash transport cassette is attached to the cash accounting apparatus, compare the cassette ID information having been read out by the reading unit of the cash accounting apparatus and the cassette ID information having been transmitted from the management unit.

2. The cash handling system according to claim 1, wherein:
a plurality of the cash accounting apparatuses are provided;
the depositing judgment unit of the management unit is configured to, when the cash transport cassette is attached to the cash settlement apparatus, judge whether the cash in the cash settlement apparatus received by the cash transport cassette is depositable into each of the cash accounting apparatuses or not;
the management unit further includes a selection unit configured to, when the cash transport cassette is attached to the cash settlement apparatus, select one of the cash accounting apparatuses based on information from the depositing judgment unit, the cash in the cash settlement apparatus received by the cash transport cassette being to be deposited into the selected cash accounting apparatus; and
the comparison unit is configured to, when the cash transport cassette is attached to any one of the plurality of cash accounting apparatuses, compare the cassette ID information having been read out by the reading unit of the cash accounting apparatus and information from the selection unit of the management unit.

3. The cash handling system according to claim 2, wherein:
in the cash settlement apparatus, a preset loading amount that is an amount of cash to be loaded into the cash settlement apparatus is set; and
the cash transport cassette is configured to receive the cash in the cash settlement apparatus such that cash of the preset loading amount remains in the cash settlement apparatus, and is configured to transfer the received cash to the cash accounting apparatus.

4. The cash handling system according to claim 1, wherein:
in the cash settlement apparatus, a preset loading amount that is an amount of cash to be loaded into the cash settlement apparatus is set; and
the cash transport cassette is configured to receive the cash in the cash settlement apparatus such that cash of the preset loading amount remains in the cash settlement apparatus, and is configured to transfer the received cash to the cash accounting apparatus.

5. The cash handling system according to claim 1, wherein:
in the cash settlement apparatus, a preset loading amount that is an amount of cash to be loaded into the cash settlement apparatus is set; and
the management unit further includes a dispensing judgment unit configured to, when the cash transport cassette is attached to the cash settlement apparatus, judge whether cash of an amount satisfying the preset loading amount of the cash settlement apparatus may be dispensed from the cash accounting apparatus or not.

6. The cash handling system according to claim 5, wherein:
a plurality of the cash accounting apparatuses are provided;
the depositing judgment unit of the management unit is configured to, when the cash transport cassette is attached to the cash settlement apparatus, judge whether the cash in the cash settlement apparatus received by the cash transport cassette is depositable into each of the cash accounting apparatuses or not;
the dispensing judgment unit of the management unit is configured to, when the cash transport cassette is attached to the cash settlement apparatus, judge whether cash of an amount satisfying the preset loading amount of the cash settlement apparatus may be dispensed from each of the cash accounting apparatuses or not;
the management unit further includes a selection unit configured to, when the cash transport cassette is attached to the cash settlement apparatus, select one of the cash accounting apparatuses based on information from the depositing judgment unit and the dispensing judgment unit, the cash in the cash settlement apparatus received by the cash transport cassette being to be deposited into the selected cash accounting apparatus; and
the comparison unit is configured to, when the cash transport cassette is attached to any one of the plurality of cash accounting apparatuses, compare the cassette ID information having been read out by the reading unit of the cash accounting apparatus and information from the selection unit of the management unit.

7. A cash handling method comprising:
attaching a cash transport cassette to a cash settlement apparatus;
reading out, by the cash settlement apparatus, cassette ID information of the cash transport cassette attached to the cash settlement apparatus, and transmitting to a management unit the cassette ID information and information related to cash in the cash settlement apparatus received by the cash transport cassette;

judging, by the management unit, when the cash transport cassette is attached to the cash settlement apparatus, whether the cash in the cash settlement apparatus received by the cash transport cassette is depositable into a cash accounting apparatus or not;

transmitting, by the management unit, to a comparison unit, the cassette ID information of the cash transport cassette that transports the cash having been judged to be depositable into the cash accounting apparatus;

detaching the cash transport cassette, which has received the cash in the cash settlement apparatus, from the cash settlement apparatus and thereafter attaching the cash transport cassette to the cash accounting apparatus;

reading out, by the cash accounting apparatus, the cassette ID information of the cash transport cassette attached to the cash accounting apparatus, and transmitting the cassette ID information to the comparison unit; and comparing, by the comparison unit, when the cash transport cassette is attached to the cash accounting apparatus, the cassette ID information having been read out by the cash accounting apparatus and the cassette ID information having been transmitted from the management unit.

8. A management unit used in a cash handling system including: a cash settlement apparatus configured to perform a settlement process with respect to a customer, by depositing and dispensing cash; a cash accounting apparatus configured to dispense cash to be loaded into the cash settlement apparatus, and configured to deposit cash having been collected from the cash settlement apparatus; a cash transport cassette attachable to and detachable from the cash settlement apparatus and the cash accounting apparatus, the cash transport cassette configured to receive cash from the cash settlement apparatus to transfer the cash to the cash accounting apparatus; the management unit; and a comparison unit;

wherein:
the management unit is communicably connected to the cash settlement apparatus and the cash accounting apparatus, the management unit includes a depositing judgment unit configured to, when the cash transport cassette is attached to the cash settlement apparatus, judge whether cash in the cash settlement apparatus received by the cash transport cassette is depositable into the cash accounting apparatus or not; and the management unit is configured to transmit to the comparison unit the cassette ID information set to the cash transport cassette that transports the cash having been judged by the depositing judgment unit to be depositable into the cash accounting apparatus.

9. A cash accounting apparatus used in a cash handling system including: a cash settlement apparatus configured to perform a settlement process with respect to a customer, by depositing and dispensing cash; the cash accounting apparatus configured to dispense cash to be loaded into the cash settlement apparatus, and configured to deposit cash having been collected from the cash settlement apparatus; a cash transport cassette attachable to and detachable from the cash settlement apparatus and the cash accounting apparatus, the cash transport cassette configured to receive cash from the cash settlement apparatus to transfer the cash to the cash accounting apparatus; a management unit; and a comparison unit;

wherein:
the cash transport cassette includes a memory unit configured to store at least cassette ID information for specifying the cash transport cassette;

each of the cash settlement apparatus and the cash accounting apparatus has a reading unit configured to read out the cassette ID information from the memory unit of the cash transport cassette;

the management unit is communicably connected to the cash settlement apparatus and the cash accounting apparatus, the management unit includes a depositing judgment unit configured to, when the cash transport cassette is attached to the cash settlement apparatus, judge whether cash in the cash settlement apparatus received by the cash transport cassette is depositable into the cash accounting apparatus or not, and the management unit is configured to transmit to the comparison unit the cassette ID information of the cash transport cassette that transports the cash having been judged by the depositing judgment unit to be depositable into the cash accounting apparatus; and the comparison unit is configured to, when the cash transport cassette is attached to the cash accounting apparatus, compare the cassette ID information having been read out by the reading unit of the cash accounting apparatus and the cassette ID information having been transmitted from the management unit.

10. A cash accounting apparatus to which a cash transport cassette storing cash is attachable, wherein:
the cash transport cassette includes a memory unit configured to store at least cassette ID information for specifying the cash transport cassette;

information related to whether the cash stored in the cash transport cassette is depositable into the cash accounting apparatus or not, or information related to whether the cash stored in the cash transport cassette is to be deposited into the cash accounting apparatus or not, is generated in advance in relation to the cassette ID information; and the cash accounting apparatus includes: a reading unit configured to read out the cassette ID information from the memory unit of the cash transport cassette; and a comparison unit configured to, when the cash transport cassette is attached to the cash accounting apparatus, compare the cassette ID information having been read out by the reading unit and the cassette ID information in relation to the information generated in advance.

* * * * *